US012374125B1

(12) United States Patent
Funke et al.

(10) Patent No.: US 12,374,125 B1
(45) Date of Patent: Jul. 29, 2025

(54) OBJECT DESTINATION AND TRAJECTORY PREDICTION BASED ON SEMANTIC FEATURES

(71) Applicant: Zoox, Inc., Foster City, CA (US)

(72) Inventors: Joseph Funke, Redwood City, CA (US); Genie Kim, Seoul (KR); Steven Cheng Qian, San Francisco, CA (US); Zheyuan Xie, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 675 days.

(21) Appl. No.: 17/554,378

(22) Filed: Dec. 17, 2021

(51) Int. Cl.
*G06V 20/58* (2022.01)
*G05D 1/00* (2024.01)
*G06N 3/08* (2023.01)

(52) U.S. Cl.
CPC ........... *G06V 20/58* (2022.01); *G05D 1/0088* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2020/0042781 A1* | 2/2020 | Zuckerman | H04N 7/181 |
| 2020/0117200 A1* | 4/2020 | Akella | B60W 50/0097 |
| 2020/0223451 A1* | 7/2020 | Shashua | G06V 40/10 |
| 2021/0094577 A1* | 4/2021 | Shalev-Shwartz | G06V 20/584 |
| 2021/0390291 A1* | 12/2021 | Sameer | G06V 40/103 |
| 2022/0156576 A1* | 5/2022 | Rasouli | G06N 3/045 |
| 2022/0161824 A1* | 5/2022 | Refaat | G01S 13/581 |
| 2022/0227231 A1* | 7/2022 | Husain | B60L 15/2045 |
| 2023/0131916 A1* | 4/2023 | Elbaz | G06F 16/54 |
| | | | 715/809 |

OTHER PUBLICATIONS

Peixin et al., "Crossing-Road Pedestrian Trajectory Prediction via Encoder-Decoder LSTM," Oct. 2019, IEEE, 2019 IEEE Intelligent Transportation Systems Conference (ITSC), Auckland, New Zealand, pp. 2027-2033 (Year: 2019).*

* cited by examiner

*Primary Examiner* — Aniss Chad
*Assistant Examiner* — Madison R. Inserra
(74) *Attorney, Agent, or Firm* — Lee & Hayes, P.C.

(57) ABSTRACT

A prediction component of an autonomous vehicle may detect and use a combination of object attributes and semantic features to determine potential destinations and corresponding potential trajectories for the dynamic objects in an environment. In some examples, the prediction component may analyze sensor data using trained models to determine a number of object attributes for a dynamic object, as well as semantic features associated with the intent or purpose of the dynamic object. Using a combination of the object attributes and the semantic features, for the dynamic object and any number of potential destination(s), the prediction component may predict a likely potential destination and determine a predicted trajectory for the dynamic object. Based on predicted trajectory of the dynamic object, the autonomous vehicle may select and execute driving maneuvers to control the autonomous vehicle safely and efficiently within the environment.

20 Claims, 10 Drawing Sheets

OBJECT DESTINATION AND TRAJECTORY PREDICTION BASED ON SEMANTIC FEATURES

BACKGROUND

Autonomous vehicles may include computing systems configured to navigate along designated routes from an initial location toward a destination. An autonomous vehicle may utilize various systems and components to traverse through environments including various static and dynamic objects, including moving and stationary vehicles (autonomous or otherwise), people, buildings, and other objects. While traversing an environment, an autonomous vehicle may make navigation decisions based on the predicted behaviors of other dynamic objects, to ensure the safety of passengers and other surrounding persons and objects. However, predicting the behaviors of vehicles, pedestrians, and other dynamics in an environment may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
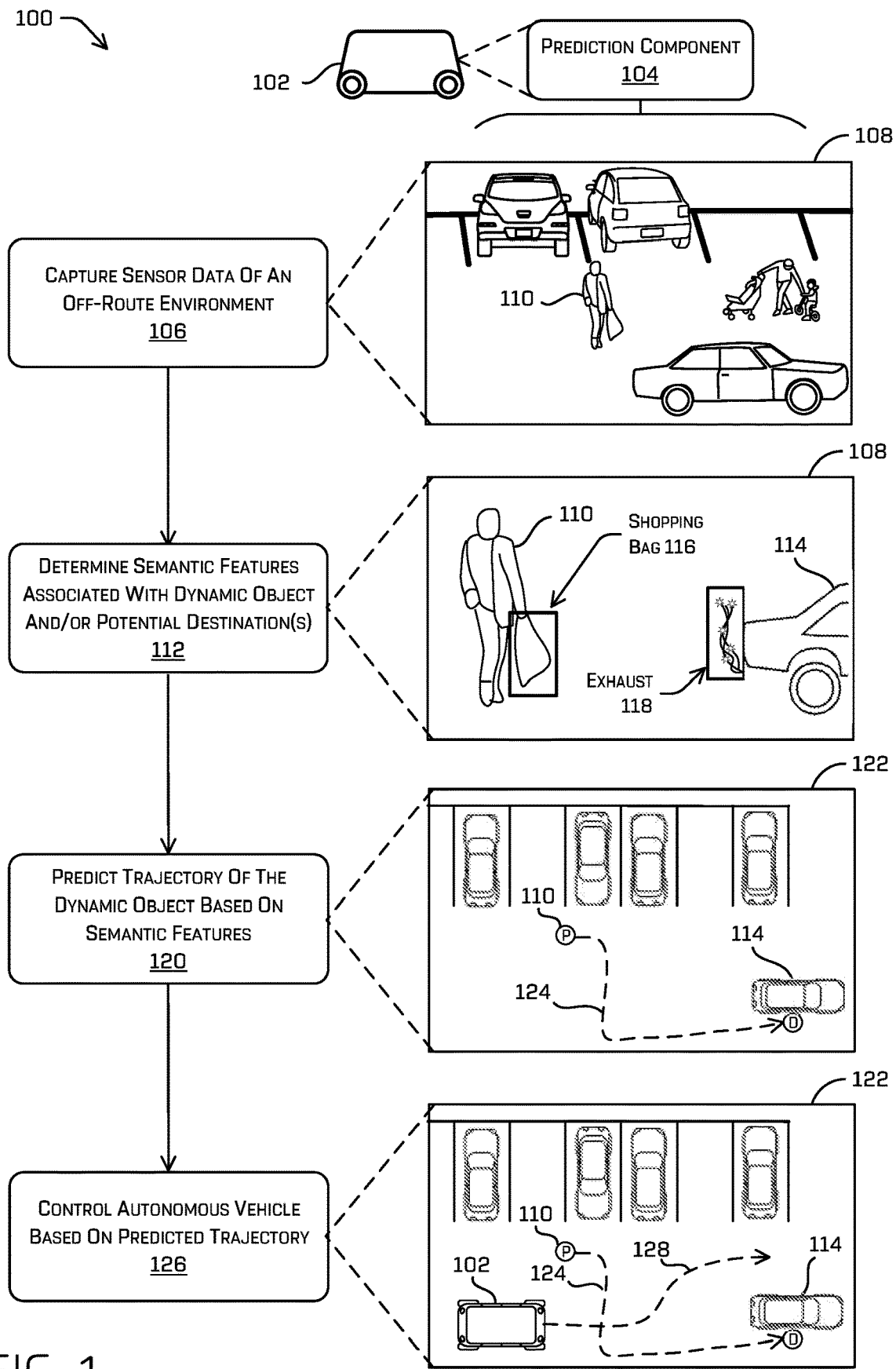
FIG. 1 illustrates an example technique for predicting a destination and trajectory for a dynamic object based on semantic features, in accordance with one or more examples of the disclosure.

Techniques described herein relate to predicting potential destinations and potential trajectories for dynamic objects in driving environments. A prediction component of an autonomous vehicle may detect and use a combination of object attributes and semantic features for a dynamic object in the environment, to determine and evaluate potential destinations for the dynamic object. Object attributes may include attributes based on the classification or state of the dynamic object, such as the object type, size, position, velocity, etc. In contrast, semantic features of an object may include observable features relating to a current intent or purpose of the object. In some examples, the semantic features of a dynamic object may provide contextual indicators of a particular destination or type of destination for the dynamic object, or may indicate a relationship between groups of objects. The prediction component may determine semantic features for a dynamic object and for any number of potential destination objects in an environment, and may determine one or more probable destinations for the dynamic object based on the combination of the object attributes and the semantic features. Based on the probable destinations for a dynamic object, the prediction component may determine one or more predicted trajectories for the dynamic object and may use the predicted trajectories to determine driving maneuvers for the autonomous vehicle to perform to traverse the environment safely and efficiently.

When an autonomous vehicle is operating in a driving environment, the vehicle may use sensors to capture sensor data (e.g., image or video data, radar data, lidar data, sonar data, etc.) of the surrounding environment, and may analyze the sensor data to detect and classify objects within the environment. Objects encountered by the autonomous vehicle may include other dynamic objects that are capable of movement (e.g., vehicles, motorcycles, bicycles, pedestrians, animals, etc.) and/or static objects (e.g., buildings, road surfaces, trees, signs, barriers, parked vehicles, etc.). In order to safely traverse the driving environment, the autonomous vehicle may include components configured to analyze the attributes of the detected objects and predict trajectories for objects. For example, perception and/or prediction components of an autonomous vehicle may execute trained models or other subcomponents configured to detect and classify objects based on the sensor data (e.g., segmentation, classification, tracking, etc.), and to analyze the movement of the objects to predict future routes and/or trajectories, etc. For instance, perception and/or prediction components may analyze various modalities of sensor data to classify objects into object types (e.g., cars, trucks, motorcycles, pedestrians, cyclists, animals, buildings, trees, etc.), and may determine object attributes and predict object behaviors (e.g., potential destinations and/or trajectories) based on the classification and other object attributes.

Autonomous vehicles may operate in various driving environments, including environments with route-based reference systems and off-route environments. A route-based reference system may include a coordinate frame and designated routes based on one or more maps of an environment. As described below, an autonomous vehicle may include a localization component and maps modeled in two or more dimensions that provide information about the environment, such as topologies (such as intersections), streets, roads, terrain, and the environment in general. Dynamic objects (e.g., pedestrians, vehicles, etc.) in a route-based reference system may follow route-based trajectories toward their destinations, and may perform route-based actions such as continuing straight along a route, executing lane changes, merging or turning onto different roads (e.g., for vehicles), following sidewalks or crossing crosswalks (e.g., for pedestrians), and the like.

Driving environments that are not associated with route-based reference systems may be referred to as off-route environments. For example, parking lots, school or corporate campuses, and/or other private road systems might not be included in any route-based reference system(s) available to the autonomous vehicle. Additionally, construction projects, road damage and/or vehicle accidents might alter route-based reference systems by closing lanes, diverting traffic, etc. In these environments, dynamic objects (e.g., pedestrians, vehicles, etc.) may determine off-route trajectories that do not correspond to designated roads, sidewalks, or other throughways defined by a route system. Examples of off-route trajectories may include navigation routes within parking lots, maneuvers for parking or pulling over (e.g., for vehicles), or walking routes to or from a vehicle, store, or landmark (e.g., for a pedestrian), etc.

To navigate an environment safely and efficiently, it may be important for an autonomous vehicle to accurately predict the future locations of the dynamic objects in the environment. However, predicting the trajectories of dynamic objects in real-world driving environments can be technically challenging and computationally expensive. For example, an autonomous vehicle may predict a future trajectory for an object based on a current or previous trajectory of the object, the existing velocity vector of the object, and/or the map data associated with the environment. However, dynamic objects may change their trajectories frequently and unpredictably, requiring the autonomous vehicle to update the predicted object trajectories and determine corresponding updated driving maneuvers on the fly for the autonomous vehicle to perform. Within off-route environments, the behaviors of dynamic objects can be even more unpredictable, since the objects may be engaged in unusual and specialized maneuvers and may be unconstrained by driving rules or route-based reference systems.

To address the technical challenges associated with predicting trajectories for dynamic objects in driving environments, including route-based reference systems and off-route environments, the techniques described herein include determining and using semantic features of dynamic objects and potential destinations to predict dynamic object trajectories. As described in more detail below, a prediction component of an autonomous vehicle may capture and analyze sensor data to determine attributes and/or semantic features associated with the objects in the driving environment. In some examples, the prediction component may use machine-learned models trained to determine semantic features indicative of the intent or purpose of a dynamic object. Using a combination of object attributes of the dynamic object, semantic features of the dynamic object and the potential destination(s) for the object, and/or the map data associated with the environment, the prediction component may determine one or more probable destinations for the dynamic object. Based on the probable destinations of the dynamic object, the autonomous vehicle may determine one or more potential trajectories for the object, and may select and execute driving maneuvers for the autonomous vehicle based on the potential trajectories of the dynamic objects in the environment.

Various sensor data types (or modalities) may be captured as the autonomous vehicle traverses the driving environment. In some examples, the autonomous vehicle may include, among other sensors, one or more cameras configured to capture image data (e.g., individual images and/or video), audio sensors (e.g., microphones) configured to capture sound, radar sensors configured to capture radar data, and/or lidar sensors configured to capture lidar data, etc. Images and other sensor data captured by the vehicle sensors may be analyzed to detect objects, either independently of or in conjunction with the detection of the objects by the other vehicle sensors. Once detected, in some examples, the image data/sensor data may be cropped to an area of interest surrounding the objects, e.g., based on size (centimeters, pixels, etc.) surrounding individual objects, based on a bounding box surrounding the object, and so forth. After detecting a dynamic object based on the sensor data, a perception component of the autonomous vehicle may determine various attributes, such as the size, position, pose, orientation, velocity, acceleration, and the like, for the dynamic object.

Additionally or alternatively, a prediction component of the autonomous vehicle may analyze the sensor data to determine particular semantic features associated with the objects detected in the environment. For example, for a pedestrian in the environment, a semantic feature component may determine particular items being carried by the pedestrian (e.g., shopping bags, a purse, a suitcase, a computer bag, a gym bag, a food item, a beverage, etc.), wheeled vehicles controlled by the pedestrian (e.g., a stroller, shopping cart, luggage cart, gurney, etc.), an animal associated with the pedestrian (e.g., dog, cat, horse, etc.), and/or a uniform being worn by the pedestrian (e.g., a store employee uniform, law enforcement or medical personnel uniform, etc.). For a vehicle in the environment, the semantic feature component may determine whether the vehicle is currently running (e.g., idling), whether the trunk is open, whether one or more doors or windows are open, whether passengers are in the vehicle, and/or whether any signals are operating on the vehicle (e.g., turn signals, hazard lights, etc.). In some examples, the semantic feature component also may determine semantic features for static objects, such as landmarks, stores, and other retail locations in the environment. For instance, the semantic feature component may determine whether a store is currently open, the name of the store and/or what type of goods the store sells, and the like. As described below in more detail, the semantic feature component may determine other semantic features for different types/classifications, for both static and dynamic objects that may be detected in the environment.

In some examples, the prediction component may be configured to use convolutional neural networks (CNNs) and/or other machine learning models (e.g., recurrent neural networks, graph neural networks, etc.) to detect and classify any of the semantic features described herein. For instance, a semantic feature component of the prediction component may use the outputs from object detection models within the perception component (e.g., object boundaries, shapes, sizes, types, etc.) and/or sensor data captured by the vehicle sensors, as input to one or more specialized trained models configured to determine particular semantic features of objects in the environment. The semantic feature component may use machine-learned models, CNNs, and/or other neural networks, to detect specific semantic features associated with objects (e.g., a vehicle, pedestrian, etc.), based on the size, shape, color, and/or movement patterns associated with the objects and/or other associated objects. The trained models used by the semantic feature component may receive image data as input, and/or may receive other types of input data (e.g., lidar point clouds, audio data, radar data, etc.), and may output determinations of semantic features associated with various objects in the environment.

As described herein, an exemplary neural network is a biologically inspired algorithm that passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters. Although discussed in the context of neural networks, any type of machine learning can be used consistent with this disclosure. In some examples, the prediction component may include processor-executable instructions stored in a memory of the vehicle computing device(s) and/or accessible thereto, hardware, and/or some combination thereof (e.g., a field-programmable gate array (FPGA), application-specific integrated circuit (ASIC)).

In some examples, the prediction component may then use a destination prediction component configured to determine and evaluate potential destinations for a dynamic object, based on the semantic features associated with the object and the potential destinations. The destination prediction component may input the semantic features determined for a dynamic object, and/or the semantic features determined for one or more possible destinations of the dynamic object, into a machine-learned model trained to determine probabilities for the possible destinations. In some examples, a trained model may be used to determine one or more probable destinations for the dynamic object and may determine probability values (e.g., confidence scores) associated with any number of the possible/probable destinations. A trained model for destination prediction may receive various inputs, including the semantic features for the dynamic object, the semantic features for the potential destinations, and/or various other attributes of the dynamic object (e.g., position, velocity, orientation, etc.) or any other objects in the environment. For instance, in the context of a pedestrian, a destination prediction component can determine one or more likely destinations for the pedestrian, which may include vehicles, other pedestrians, buildings, crosswalks, and/or other landmarks detected by the vehicle. Similar or identical trained models may be used to determine potential destinations and associated probabilities for other types of dynamic objects, such as vehicles, bicycles, animals, and/or other dynamic objects.

Additionally, as described below in more detail, the destination prediction component also may use models configured to determine groupings and/or relationships between different objects. For example, a pedestrian may be associated with a particular vehicle, landmark location, or group of other pedestrians. The groupings or relationships for a dynamic object may be used to determine probable destinations for the dynamic object, which may include absolute destinations (e.g., fixed locations in the environment) and/or relative destinations (e.g., proximity ranges to related dynamic objects). As a non-limiting example of such, where a pedestrian is detected to be within a group of pedestrians (e.g., two or more), the model may be biased to form predictions in which the single pedestrian's prediction is based at least in part on the dynamics of the group as a whole.

In various examples, the machine-learned models used to determine semantic features may output an indication that a dynamic object is in a particular state, and/or may analyze the features of the environment surrounding the object. For instance, a model may be a classifier that outputs an indication corresponding to a pedestrian state (e.g., carrying shopping bags, walking a pet, pushing a shopping cart or stroller, carrying an umbrella, etc.) or a vehicle state (e.g., trunk open, passenger door open, engine idling, etc.). Additionally or alternatively, trained models may output binary states and/or non-binary (e.g., score, weights, costs, etc.) states for pedestrians, vehicles, and/or other objects in the environment. As described below, additional examples of models may output predicted trajectories for the vehicle based on the determination of vehicle states corresponding to semantic features, and/or probable destinations of the vehicle.

For instance, a trajectory prediction component may predict one or more potential trajectories for a dynamic object, based at least in part on the determination of semantic features and/or the potential destinations determined for the dynamic object. Semantic features of the dynamic object and/or potential destinations may be used directly (e.g., as input to a trajectory prediction model) or indirectly (e.g., as input to a destination prediction model) to determine a path or trajectory that the dynamic object may follow within the environment. In some cases, the trajectory prediction component may determine multiple potential trajectories for a dynamic object based on the multiple potential destinations in the environment surrounding the object. In some cases, the trajectory prediction component may select a most likely trajectory (or several most likely trajectories) from multiple possible trajectories and may plan a trajectory for the autonomous vehicle to follow based on the most likely predicted trajectory/trajectories for the dynamic object.

In some examples, the prediction component may predict destinations and/or trajectories for a dynamic object by generating, using the machine-learned model(s) described above and/or other machine-learned models, a top-down image comprising different channels that include information associated with different features of the environment. For instance, a top-down multi-channel representation of the environment may include different channels based on different sensor modalities and/or different aspects of the sensor data, such as traffic lanes, map data, objects in the environment, and the like. A destination prediction machine-learned model may be configured to output one or more predicted destinations for a dynamic object based on a top-down multi-channel representation. Similarly, a trajectory prediction machine-learned model may output coordinates for one or more predicted trajectories (e.g., x-coordinates and y-coordinates) associated with the dynamic object at one or more times in the future (e.g., 1 second, 2 seconds, 3 seconds, etc.). In some examples, machine-learned models for predicting destinations and/or trajectories can also probability information associated with a predicted destination and/or with trajectory coordinates.

In some examples, a top-down representation corresponding to the driving environment can be represented by individual channels of a multichannel representation (e.g., image, encoding, matrix representation, tensor representation, etc.), where each channel (or layer) represents different information about the dynamic object and the environment in which the object is located. In various examples, each channel of a multi-channel representation can separately encode a like attribute, class, feature, and/or signal within the scenario. For instance, object attributes and/or semantic features of a dynamic object may be encoded into the same or a different channel in the multi-channel representation. A channel including semantic features associated with objects and potential destinations may store the semantic features as encodings (e.g., binary masks) which identify the locations and characteristics of particular semantic features and/or other object attributes within a grid representation of the driving environment. The individual channels of a multi-channel representation may represent, but are not limited to, one or more of: road network information (e.g., semantic labels indicating lanes, crosswalks, stop lines, lane dividers, stop signs, intersections, traffic lights, and the like), traffic data, bounding boxes associated with the autonomous vehicle and/or other objects, object attributes (e.g., object types, sizes, orientations, poses, velocities and accelerations in the x and y directions, etc.) associated with any number of objects, and/or semantic features associated with any number of objects, potential destinations, and the like. Any number of the channels in a multi-channel representation can be provided as input to a trained model for predicting destinations and/or trajectories for dynamic objects as described herein. As a non-limiting example of which, potential destinations may be encoded in a binary mask in which pixels associated with a non-zero value are associated with those areas in which there may be a potential destination. Additionally or alternatively, the semantic features associated with the objects/destinations in the environment can be input directly to the prediction component (e.g., without generating a plurality of channels based on the representation) to generate at least one predicted destination and/or trajectory.

Additionally, in some examples, the prediction and/or planning components may use previous sensor data captured within the environment to determine the predicted object destinations and/or trajectories for a dynamic object. For instance, data from a probability heat map (e.g., discretized probability distribution) of the environment may be provided as input to the prediction component and used to predict object destinations and/or trajectories for the dynamic objects, based on the previous destinations and/or trajectories of similar objects in the same environment. In some cases, probabilistic heat map data for destinations and/or trajectories may be encoded into a channel of a multi-channel top-down representation of the environment and used as input to the trained destination and trajectory prediction models. In various examples, probability heat map data may be based on previously recorded sensor data and associated with a time of day, day of the week, month of the year, or the like. The probability data may be determined utilizing machine learning techniques. For example, one or more machine-learned models may be trained using previously recorded sensor data captured at various times to determine a probability that a dynamic object may follow a particular trajectory and/or arrive at a particular destination.

Additional techniques and examples of determining object behaviors and/or predicted trajectories using a probabilistic heat map can be found in U.S. patent application Ser. No. 15/807,521, filed Nov. 8, 2017, and entitled "Probabilistic Heat Maps for Behavior Prediction," the entire contents of which are incorporated herein by reference for all purposes. Additional techniques and examples of predicting object trajectories using trained models based on top-down multi-channel representations of driving environments can be found in U.S. Pat. No. 11,169,531, filed Oct. 4, 2018, and entitled "Trajectory Prediction on Top-Down Scenes," and in U.S. patent application Ser. No. 16/504,147, filed Jul. 5, 2019, and entitled "Prediction on Top-Down Scenes based on Action Data," the entire contents of which are incorporated herein by reference for all purposes. In various examples, the one or more predicted trajectories may be determined utilizing tree search methods, temporal logic formulae, and/or machine learning techniques.

Based on the outputs from the destination and/or trajectory prediction components for the dynamic objects in the environment, the autonomous vehicle may determine various driving maneuvers to perform. For instance, a planning component of the autonomous vehicle may determine a driving maneuver to avoid a potential collision or other interaction with the dynamic objects and/or other objects in the environment and may select a route to traverse the environment safely and efficiently. In some cases, the prediction and/or planning components may control the autonomous vehicle to maintain its current position (e.g., by stopping the autonomous vehicle), reverse course (e.g., in off-route environments) to provide the dynamic objects with additional space to maneuver. In other cases, the prediction and/or planning components may control the autonomous vehicle to follow a modified trajectory that continues along a route to an intended destination of the autonomous vehicle but changes the route to circumvent the predicted trajectories of the dynamic objects in the environment.

As an illustration of a specific example, consider a pedestrian that is moving through a parking lot next to a lane of parking spaces. An autonomous vehicle may be traveling in the lane of parking spaces approaching the pedestrian. Without considering semantic features, the pedestrian could be moving toward any number of possible destinations, including possible trajectories moving away from the autonomous vehicle and other possible trajectories cutting in front of the autonomous vehicle. However, by detecting semantic features of the pedestrian and the various potential destinations, the prediction component may determine one or more probable destinations and/or trajectories for the pedestrian (e.g., narrowing the spread of potential trajectories the pedestrian may follow). Based on the probable destinations and/or trajectories, the autonomous vehicle may be controlled to proceed around the pedestrian, to enter a parking spot, to wait for the pedestrian to pass in front of the vehicle, or perform any other driving maneuver based on the predicted destinations and/or trajectories of the pedestrian.

The techniques discussed herein can improve the functioning of computing devices in a number of ways. For instance, the destination and/or trajectory prediction components may use as few as a single image (or a cropped portion of a single image) or other sensor data to make reliable determinations of the destinations and trajectories of dynamic objects in the environment. Consequently, significantly less processing resources are used in comparison to conventional techniques that require complex image/sensor data analysis algorithms applied to multiple images or video, and/or data supplied by other sensors to predict destinations and trajectories of objects. Since a destination and/or trajectory can be determined from a single sensor image, the prediction component may be able to determine trajectories for more objects in the environment than would be possible if multiple images, or video, or multiple different sensor modalities were required. In some cases, the described techniques are more accurate than other destination and trajectory determination mechanisms. For example, determinations of an object destination and trajectory may be inaccurate in off-route environments when the object (e.g., a pedestrian, vehicle, bicycle, etc.) quickly changes course. These determinations may be improved by using semantic features of the dynamic object and the additional objects in the surrounding environment, as described herein.

By controlling an autonomous vehicle based in part on destination and trajectory determinations of other dynamic objects, in combination with object attributes and other information gathered about the surrounding environment, the safety of the vehicle can be improved by allowing the vehicle to make trajectory decisions earlier that provide accommodations for sudden changes in direction or speed by other dynamic objects. Additionally, as described above, controlling the vehicle based in part on determining a destination and/or trajectory of another object can reduce processing resources, with as few as a single image being evaluated by the processing resources at one time during the destination and trajectory determinations.

Further, techniques for controlling autonomous vehicles based on determining probable destinations and/or trajectories of other dynamic objects can increase the confidence that the vehicle can avoid collisions with oncoming traffic and/or pedestrians, in both route-based and off-route environments. Through improved and quicker predictions of object destinations and trajectories, the autonomous vehicle may perform maneuvers earlier and with greater accuracy, which may improve safety outcomes and driving performance. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram of an example process 100 of predicting a destination and trajectory for a dynamic object in an environment based on semantic features. As shown in this example, some or all of the operations in the example process 100 may be performed by an autonomous vehicle 102 including one or more perception components, prediction components, planning components, etc. For instance, the prediction component 104 may include various components, such as a semantic feature component configured to detect semantic features associated with dynamic objects and potential destinations in the environment, a destination prediction component configured to predict destinations for the dynamic object, and a trajectory prediction component configured to predict trajectories for the dynamic object. Additionally or alternatively, the autonomous vehicle 102 may use a combination of different components to perform the techniques described herein. For example, a perception component of the autonomous vehicle 102 may perform object segmentation to detect semantic features for a dynamic object, after which the prediction component 104 may predict trajectories for the dynamic object based on the semantic features, etc.

At operation 106, the autonomous vehicle 102 may capture sensor data of an off-route driving environment including various static and/or dynamic objects. In an example, a driving scene 108 is depicted of a driving environment traversed by the autonomous vehicle 102. In some cases, the driving scene 108 may be depicted as an image captured by image sensors (e.g., cameras) of the autonomous vehicle 102, and/or may be based on various other types of sensor data captured by the autonomous vehicle 102 (e.g., lidar data, radar data, etc.).

In this example, driving scene 108 depicts an off-route driving environment corresponding to a parking lot. The parking lot shown in the driving scene 108 includes a row of parked cars, a pedestrian 110 moving through the parking lot, and various other static and dynamic objects. As noted above, off-route driving environments may include environments such as parking lots, construction zones, school or corporate campuses, private road systems, etc. However, the techniques described herein also may apply to driving environments within route-based reference system(s), including road systems with predefined operating rules (e.g., rules of the road, laws, codes, regulations, etc.).

At operation 112, the prediction component 104 of the autonomous vehicle 102 may determine one or more semantic features associated with the dynamic object(s) and/or potential destinations for the dynamic object(s) within the driving environment. In this example, the prediction component 104 may use the sensor data associated with the driving scene 108 to determine semantic features for the pedestrian 110 and one or more possible destinations for the pedestrian 110, including a vehicle 114. As discussed above, the prediction component 104 may use trained models to determine an object type (e.g., pedestrian, vehicle, etc.) and particular semantic features based on the object type. In this example, the prediction component 104 detects a shopping bag 116 being carried by the pedestrian 110. Additionally, in this case, the prediction component 104 detects exhaust 118 indicating that the vehicle 114 is idling. The shopping bag 116 being carried by the pedestrian, and the indication that the vehicle is idling are semantic features that, in the context of the parking lot environment, can provide contextual information about the probable destination of the pedestrian. In particular, based on these semantic features in combination with the additional object attributes for the pedestrian 110 and the vehicle 114 (e.g., the locations, poses, velocities, and orientations of the objects, etc.), the prediction component 104 may determine that the vehicle 114 is a probable destination for the pedestrian 110. Additionally, or alternatively, predicted destinations may be based further at least in part on a map. For instance, locations of sidewalks, crosswalks, entrances, transitions between differing areas (e.g., roadway vs parking spots, etc.) may be used to determine potential locations. In at least some examples, such destinations may be determined based at least in part on the semantic class. For instance, while ingress points and detected vehicles may form the basis of destinations for pedestrians, they may be excluded (or otherwise downweighted) for cyclists.

At operation 120, the prediction component 104 may predict one or more potential trajectories for the dynamic objects in the driving environment, based at least in part on the semantic features. As described above, the prediction component 104 may use trained models configured to output potential destinations and/or potential trajectories for a dynamic object, based on a combination of semantic features, other object attributes, and/or various attributes of the environment. In this example, the prediction component 104 has analyzed the environment (e.g., object attributes, environment attributes, and semantic features) and determined that the vehicle 114 is a probable destination for the pedestrian.

As shown in this example, the prediction component 104 may generate a top-down representation 122 of the driving scene 108. The top-down representation 122 may be a multi-channel representation, including different channels encoding different sensor modalities, object attributes, semantic features, etc. In some examples, the top-down representation 122 may be provided as input to one or more trained models configured to analyze the environment and output predicted destinations and/or trajectories for the pedestrian 110. For instance, a first trained model may predict one or more destinations for the pedestrian 110, a second trained model may use the predicted destinations to determine one or more predicted trajectories for each predicted destination. As noted above, trained models and/or other techniques used by the prediction component 104 to determine predicted destinations and/or trajectories also may output probabilities (e.g., confidence scores) associated with predicted destinations and/or trajectories. Of course, though described above with respect to two models, a single model or more than two models are contemplated. As a non-limiting example of which, potential destinations may be encoded into a binary image layer based at least in part on semantic classifications of detections (including with respect to the entity for which a prediction is being determined), map information, and the detected classifications.

In this example, the prediction component 104 may determine the vehicle 114 as a probable destination for the pedestrian 110 moving through the parking lot, and may determine a potential trajectory 124 for the pedestrian 110 toward the vehicle 114. Although only one potential destination and potential trajectory are shown in this example, in other examples the prediction component 104 may determine multiple potential destinations and/or may generate multiple potential trajectories for each destination. Additionally, as shown in this example, a destination may be determined as an object (e.g., vehicle 114) or may be determined as a particular location on or adjacent to an object. In this case the destination of the pedestrian 110 may be determined as the passenger side door of the vehicle 114, and the potential trajectory 124 may be a trajectory to that particular location adjacent to the vehicle 114, rather than to the vehicle itself.

At operation 126, the autonomous vehicle 102 may be controlled based at least in part on the predicted trajectories determined for the dynamic objects in the environment. In some examples, a planning component of the autonomous vehicle 102 may determine one or more driving maneuvers to navigate the autonomous vehicle 102 in a safe and efficient manner based on the predicted trajectories of the dynamic objects in the environment. Depending on the predicted trajectory (or trajectories) of the pedestrian 110, the autonomous vehicle 102 may be controlled to stop or yield for the pedestrian 110, or to proceed and maneuver around the predicted trajectory of the pedestrian 110. In this example, a vehicle trajectory 128 is determined for the autonomous vehicle 102 to safely navigate the parking lot environment without encroaching on the predicted trajectory of the pedestrian 110. As noted above, although only one dynamic object (e.g., pedestrian 110) is depicted in this example, in other examples the autonomous vehicle 102 may simultaneously or concurrently determine predicted trajectories for multiple dynamic objects in the environment. In such examples, the autonomous vehicle 102 may determine driving maneuvers and/or a vehicle trajectory based on the predicted destinations and trajectories for each of the dynamic objects, thereby allowing the autonomous vehicle 102 to traverse the driving environment safely and efficiently with respect to any number of the different dynamic objects in the environment.

Figure 2:
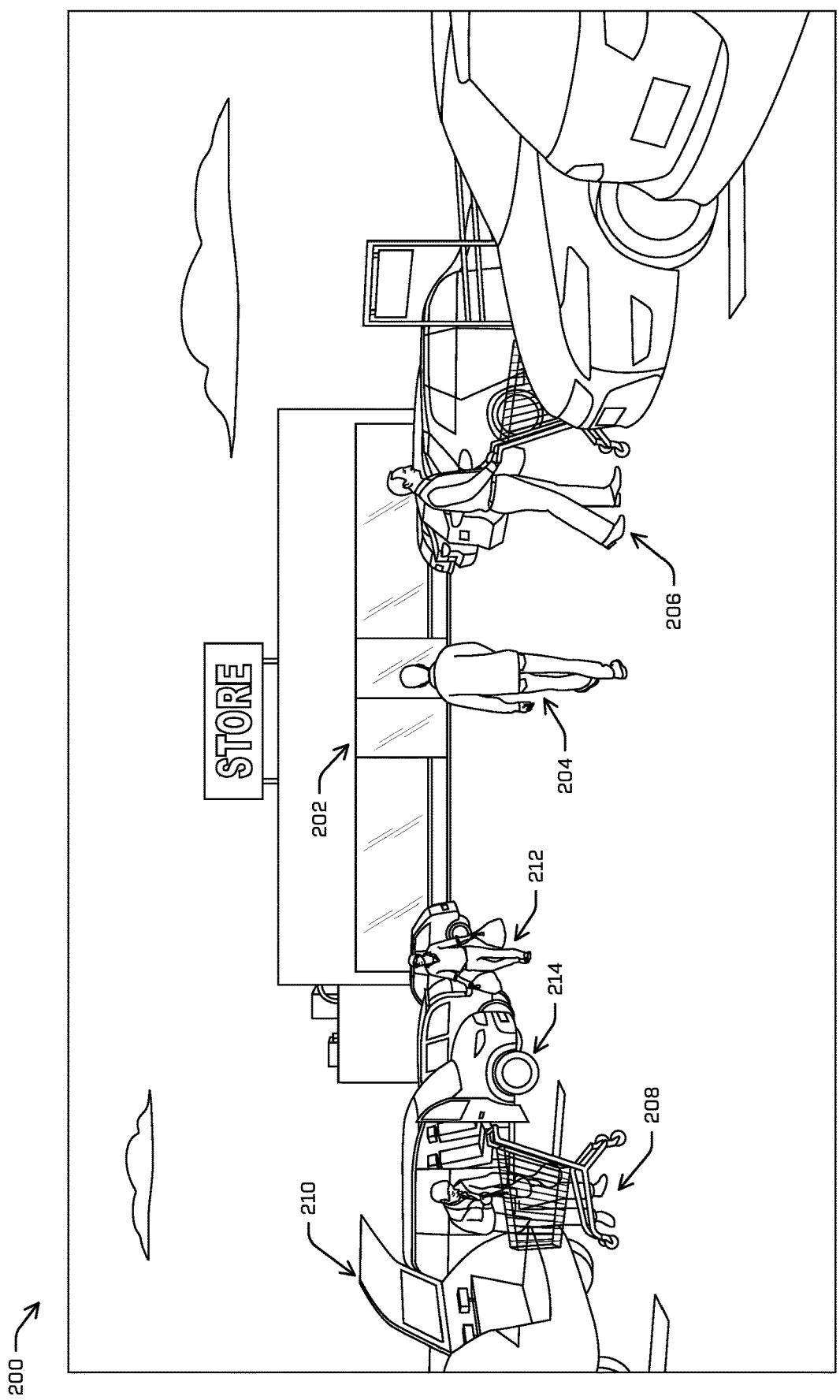
FIG. 2 depicts an example driving scene within an off-route driving environment including a parking lot, in accordance with one or more examples of the disclosure.

FIG. 2 depicts an example driving environment 200 corresponding to a parking lot used by one or more retail store locations. In this example, the driving environment 200 includes a number of dynamic objects and potential destinations associated with the dynamic objects. An autonomous vehicle including a perception component and/or prediction component may capture sensor data representing the driving environment 200, and may use the sensor data to detect the various dynamic objects and/or potential destinations for the dynamic objects. As described herein, the autonomous vehicle may use a combination of object attributes, semantic features, and/or map data of the driving environment 200 to predict potential destinations associated with any number of the dynamic objects, and to determine trajectories for the dynamic objects based on the potential destinations.

As shown in this example, the driving environment 200 includes a store entrance 202, a number of pedestrians moving within the environment, and a number of vehicles and/or other potential destinations associated with the pedestrians. In this example, the autonomous vehicle may detect a first pedestrian 204 moving toward the store entrance 202. Based on the object attributes (e.g., position, orientation, and velocity) of the first pedestrian 204, as well as based on semantic features associated with the first pedestrian 204 (e.g., demographic data, lack of shopping cart or shopping bags, etc.), the prediction component 104 may determine the store entrance 202 as a probable destination for the first pedestrian 204. For the second pedestrian 206, based on the object attributes of the pedestrian (e.g., walking direction) and/or semantic features (e.g., pushing a shopping cart), as well as the semantic features of the potential destination (e.g., available shopping cart corral), the prediction component 104 may determine the probable destination and trajectory of the second pedestrian 206. For the third pedestrian 208, based on the object attributes and/or semantic features associated the pedestrian (e.g., pose, orientation, etc.), and/or based on the semantic features of one or more potential destinations (e.g., shopping cart, vehicle 210 with open trunk, etc.), the prediction component 104 may determine the probable destination and trajectory of the third pedestrian 208. Similarly, for the fourth pedestrian 212, based on the object attributes and/or semantic features associated the pedestrian, and/or based on the semantic features of one or more potential destinations (e.g., vehicle 214 with open door, etc.), the prediction component 104 may determine the probable destination and trajectory of the fourth pedestrian 212.

Figure 3:
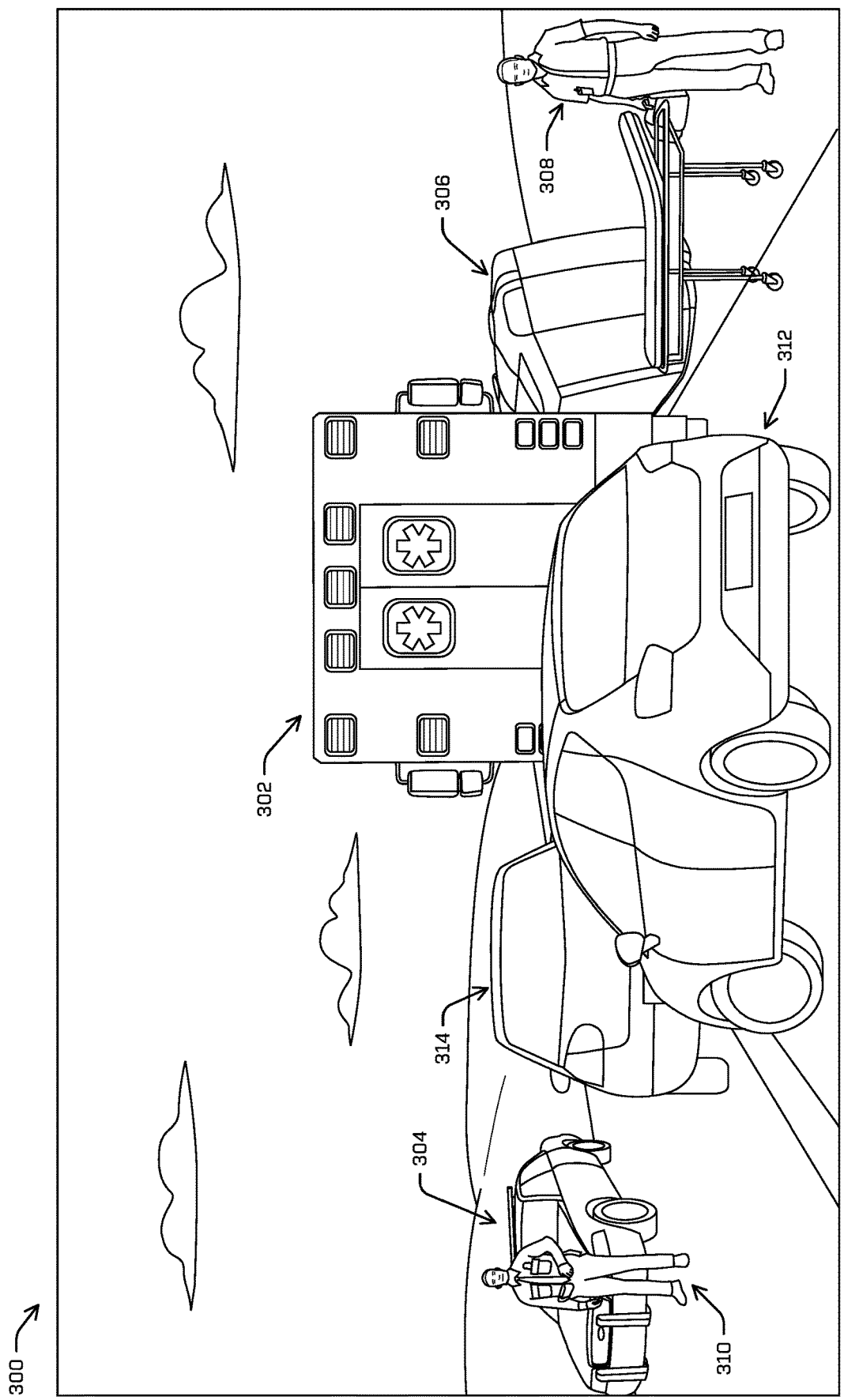
FIG. 3 depicts an example driving scene within a route-based reference system, in accordance with one or more examples of the disclosure.

FIG. 3 depicts another example driving environment 300. In this example, the driving environment 300 may correspond to a route-based driving environment depicting a vehicle accident scene. In this example, the autonomous vehicle may capture sensor data representing the driving environment 300, and may use the perception component and/or prediction component to detect and analyze the dynamic objects and potential destinations associated with the dynamic objects. As in the previous example, the autonomous vehicle may use a combination of object attributes, semantic features, and/or map data of the driving environment 300 to predict potential destinations associated with any number of the dynamic objects, and to determine trajectories for the dynamic objects based on the potential destinations.

As shown in this example, the driving environment 300 includes a two-way road in which one emergency vehicle (e.g., ambulance 302) is stopped in a first lane, a second emergency vehicle (e.g., police car 304) is stopped on the shoulder of the second lane, and a disabled vehicle 306 is lying on the shoulder of the first lane. Two pedestrians are also depicted in this example: a first pedestrian 308 (e.g., an emergency medical technician) standing near the disabled vehicle 306, and a second pedestrian 310 (e.g., a police officer) standing near the police car 304. Finally, a first additional vehicle 312 and a second additional vehicle 314 are shown, both of which are in the process of navigating around the ambulance 302 to continue driving down the road. As in the above example, the prediction component 104 (and/or a perception component) to detect any number of these dynamic objects and the potential destinations associated with the dynamic objects. The prediction component 104 may use various combinations of map data associated with the driving environment 300, the object attributes and/or semantic features of the dynamic objects, and/or the object attributes and/or semantic features of the potential destinations, to the determine one or more probable destinations or trajectories for any number of the dynamic objects in the driving environment 300.

Figure 4:
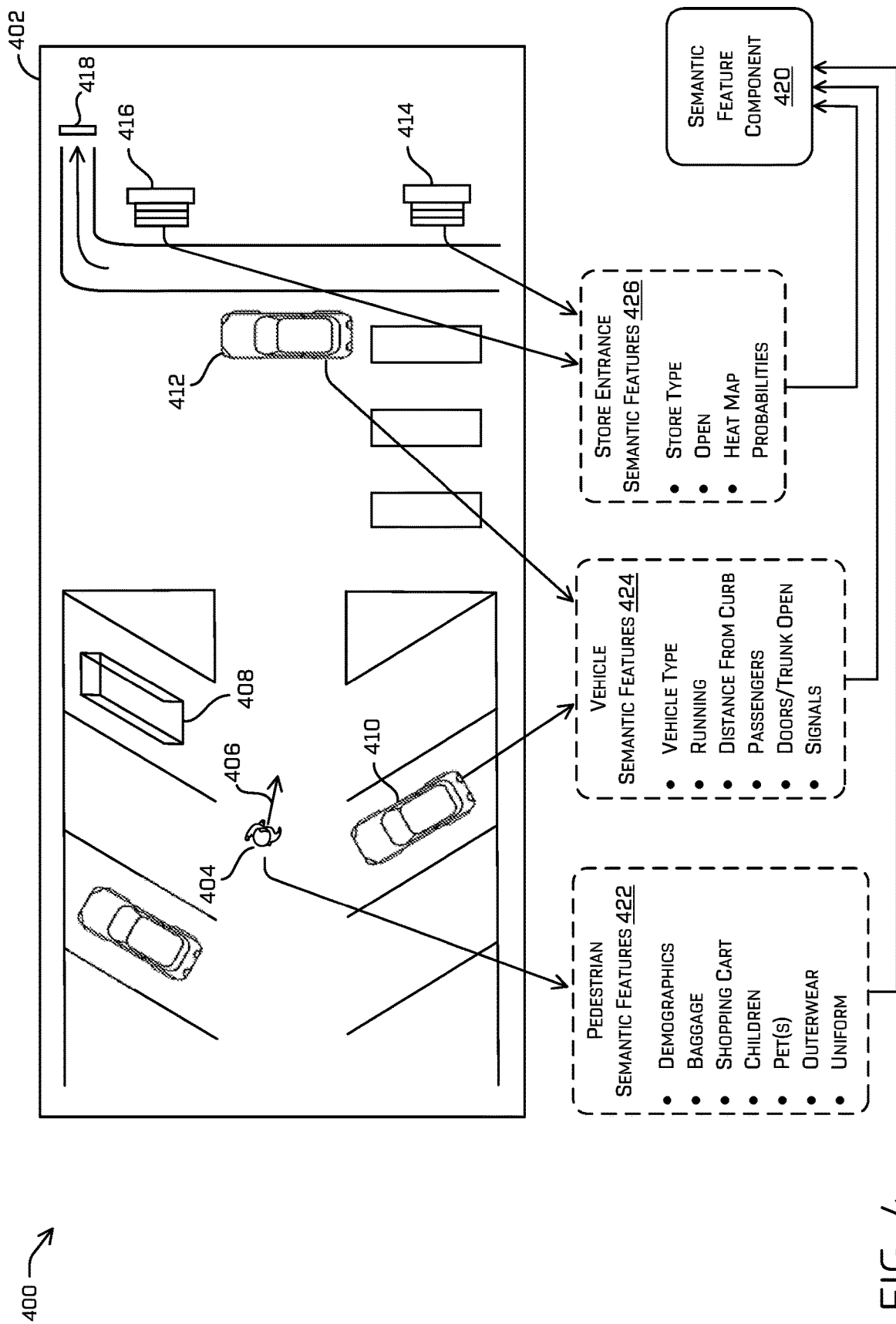
FIG. 4 illustrates an example driving environment and a semantic feature component configured to determine semantic features associated with objects in the environment, in accordance with one or more examples of the disclosure.

FIG. 4 depicts a diagram 400 illustrating example techniques of determining semantic features associated with objects in an environment. As described above, an autonomous vehicle may use sensors to capture data associated with various driving environments. In this example, a top-down representation of a driving scene 402 may correspond to a parking lot through which an autonomous vehicle is driving. The perception and/or prediction components of the autonomous vehicle may generate the top-down representation of the driving scene 402 based on the sensor data. Although the driving scene 402 is depicted as a top-down image, the top-down representation may include one or multiple channels encoding data based on different sensor modalities, different object types and attributes, and/or other attributes of the environment.

As shown in this example, a semantic feature component 420 may be configured to analyze the sensor data and detect various semantic features associated with the object in the driving environment. As described below in more detail, a prediction component (e.g., prediction component 104) of an autonomous vehicle 102 (e.g., autonomous vehicle 102) may use the semantic features to predict potential destination(s) and/or potential destination(s) for the dynamic objects in the driving environment. The driving scene 402 in this example is a parking lot, which may be an off-route environment. However, in other examples, semantic features may be determined for various other driving environments within or outside the boundaries of the route-based reference systems defined by the maps and/or localization component of the autonomous vehicle 102.

In this example, the driving scene 402 depicts a pedestrian 404 moving across the parking lot at a trajectory indicated by the velocity vector 406. In this example, the pedestrian 404 may be the only dynamic object in the driving environment; however, similar techniques may be used when dynamic objects are present in the driving environment of the autonomous vehicle. In this example, the driving scene 402 also depicts a number of possible destinations for the moving pedestrian 404. For instance, the pedestrian 404 may be moving toward the shopping cart corral 408, vehicle 410, vehicle 412, store entrance 414, store entrance 416, or sidewalk 418 (e.g., which may represent a walking route to a park or other landmark).

For any number of the dynamic object(s) in the driving environment (e.g., pedestrian 404) and/or for the potential destinations of the dynamic object(s), the semantic feature component 420 may analyze the object attributes and/or sensor data to determine semantic features associated with the objects. In some examples, the semantic feature component 420 may execute a different set of machine-learned models to detect the presence or absence of different semantic features associated with an object, based on the type/classification of the object. For instance, after determining that the pedestrian 404 is a pedestrian object type, the semantic feature component 420 may execute one or more models to detect the presence of any semantic features in the pedestrian semantic features listing 422. In this example, the semantic features associated with the pedestrian object type may include various demographic data for the pedestrian (e.g., age, height, gender, etc.), an indication of any bags carried by the pedestrian (e.g., number of bags, size, type, labels, etc.), an indication of whether the pedestrian is controlling a shopping cart, an indication of whether the pedestrian is walking with children (e.g., an indication of a stroller or baby carrier, a child walking near the pedestrian, etc.), whether the pedestrian is walking with a pet (e.g., dog, cat, horse, etc.), whether the pedestrian is wearing particular items of outerwear (e.g., a coat, hat, gloves, scarf, boots, etc.), or whether the pedestrian is wearing a uniform (e.g., a law enforcement uniform, store employee uniform, etc.).

Additionally, in this example, after determining that the potential destinations include vehicles 410 and 412, the semantic feature component 420 may execute another set of models to detect the presence of any semantic features in the vehicle semantic features listing 424. In this example, the semantic features associated with the vehicle object type may include the vehicle type (e.g., size, make, model, year, etc.), an indication of whether the vehicle is running, a distance of the vehicle from the curb (or other region boundary), a number of passengers currently in the vehicle, an indication of whether the trunk of the vehicle is open, an indication of whether a door of the vehicle is open, and/or an indication of whether one or more signals are the vehicle is operating (e.g., hazard lights, turn signals, parking lights, etc.). Further, in this example, after determining that the potential destinations include store entrances 414 and 416, the semantic feature component 420 may execute another set of models to detect the presence of any semantic features in the store entrance semantic features listing 426. In this example, the semantic features associated with the store object type may include the store type (e.g., name, type of goods sold, etc.), an indication of whether the store is currently open, and/or a heat map probability data associated with the store location (e.g., number of customers per day or per hour, customer demographics, etc.).

The various models used by the semantic feature component 420 may be configured to detect semantic features associated with the dynamic objects and potential destinations may include convolutional neural networks (CNNs) and/or other machine learning models. In some examples, semantic feature detection models may be trained to receive sensor data input including image data, lidar point clouds, radar data, and/or other sensor data associated with a region at or proximate to an object of a predetermined object type. After executing the models to determine the presence or absence of various semantic features, the semantic feature component 420 may store the semantic features, for instance, by encoding the semantic features into a channel of a multi-channel top-down representation of the driving scene 402.

Figure 5:
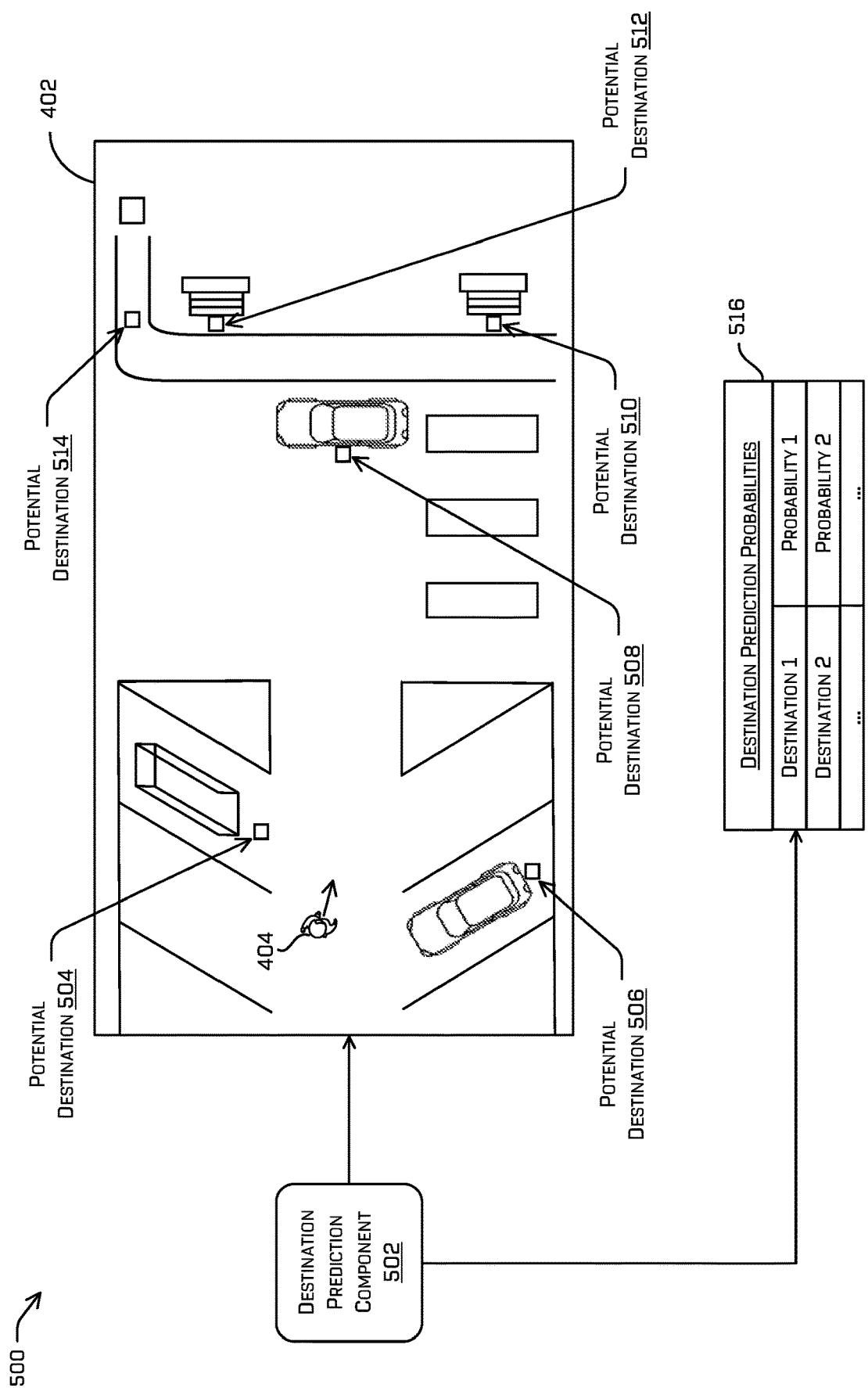
FIG. 5 illustrates an example driving environment including a destination prediction component configured to determine and evaluate potential destinations of a dynamic object based on semantic features, in accordance with one or more examples of the disclosure.

FIG. 5 depicts another diagram 500 illustrating example techniques of predicting potential destinations for a dynamic object in an environment based at least in part on the semantic features associated with the object and/or the potential destinations. In this example, the same top-down representation of the driving scene 402 is depicted, including a pedestrian 404 moving through the parking lot toward a number of possible destinations.

A destination prediction component 502 in this example may be configured to determine the potential destinations for the pedestrian 404 (and/or any other dynamic objects in the environment). In the context of a pedestrian 404, the destination prediction component 502 initially may determine various possible destinations for the pedestrian, including but not limited to vehicles, other pedestrians, buildings, crosswalks, sidewalks, or other landmarks detected by the autonomous vehicle. As noted above, a potential destination for a dynamic object may correspond to an object, or a particular location on or adjacent to the object. For instance, as shown in this example, the potential destinations for the pedestrian 404 may include a potential destination 504 at the front of the shopping cart corral 408, a potential destination 506 at the rear of the vehicle 410, a potential destination 508 at the driver side door of the vehicle 412, a potential destination 510 at the front entrance of the store 414, a potential destination 512 at the front entrance of the store 416, or a potential destination 514 at a location on the sidewalk leading to a park entrance or other landmark.

The destination prediction component 502 may use trained models and/or other techniques to determine potential destinations for the dynamic object. In some examples, the destination prediction component 502 may use the semantic features determined for the dynamic object and the various possible destinations in the environment, to determine probabilities associated with the possible destinations. For instance, a destination prediction model may receive as input a multi-channel top-down representation of a driving scene 402, including semantic features associated with the objects in the driving scene 402. As noted above, the semantic features may be encoded into a channel of the multi-channel representation in some cases. Additionally or alternatively, a destination prediction model may use other object attributes, such as the relative locations of the objects, the object velocities, orientations, poses, etc., to determine any number of possible destinations and/or probabilities associated with the possible destinations. In some cases, a destination prediction model may output a single potential destination (e.g., a probable or most likely destination), and in other cases, a destination prediction model may output a number of potential destinations along with corresponding destination probability data. In this example, table 516 depicts multiple potential destinations determined by the destination prediction component 502 for the pedestrian 404, and corresponding probability data for each of the potential destinations.

In some examples, the destination prediction component 502 may determine an initial set of possible destinations (and/or probabilities) for a dynamic object based on object attributes such as the relative object locations, velocities, orientations, etc. The destination prediction component 502 then may modify the set of possible destinations and/or probabilities based on the semantic features. For instance, an initial set of probabilities for the potential destinations 504-514 may be determined based on how closely each potential destination comports with the current velocity vector 406 of the pedestrian 404. However, the destination prediction component 502 may then modify the probabilities of the potential destination, including adding or removing potential destinations, based on the combination of the semantic features. For instance, a potential destination that is close to the current path of the pedestrian 404 may have its corresponding probability lowered if the combination of the semantic features makes it a less likely destination for the pedestrian 404. Similarly, another potential destination that is further away and/or not in line with the current path of the pedestrian 404 may have its corresponding probability raised if the combination of the semantic features makes it a more likely destination for the pedestrian 404. As an example, the combination of a pedestrian carrying shopping bags, and a vehicle idling and/or with a trunk or door open, may make the vehicle a more likely destination for the pedestrian. As another example, a semantic feature indicating that a pedestrian is pushing a shopping cart may make a grocery store more likely destination for the pedestrian, but may make a different type of store (e.g., a jewelry store, coffee shop, etc.) near the grocery store a less likely destination. As yet another example, a pedestrian walking in dress shoes and without carrying a bag may make a gym or fitness center a less likely destination for the pedestrian, but may make a nearby car or restaurant a more likely destination. It can be understood from the context of this disclosure that these examples are illustrative only, and that machine-learned destination prediction model and/or other techniques may take into account any combination of the semantic features described herein for dynamic objects and potential destinations to determine or modify probabilities associated with the potential destinations.

Figure 6:
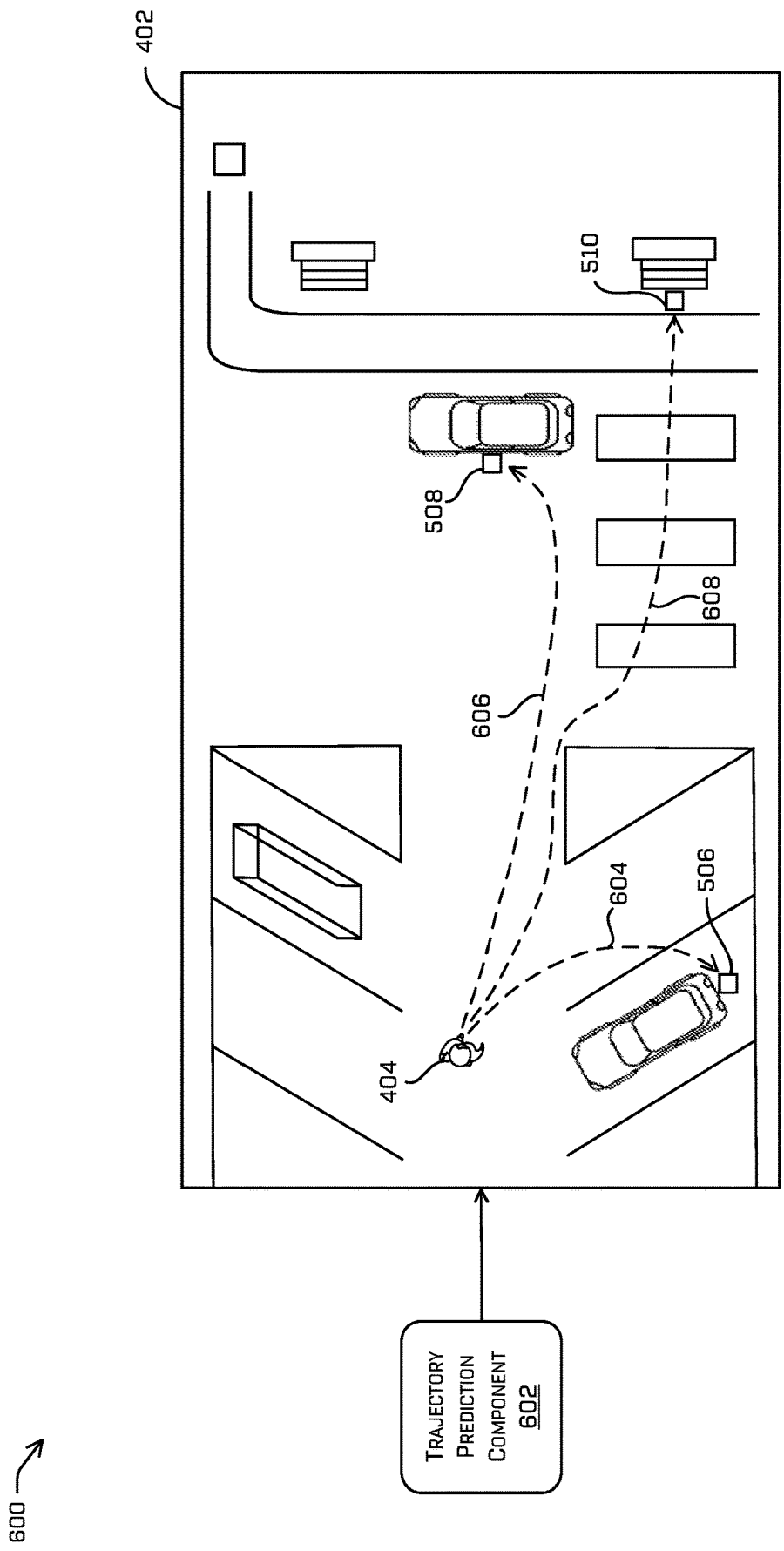
FIG. 6 illustrates an example driving environment including a trajectory prediction component configured to determine potential trajectories of a dynamic object based on semantic features, in accordance with one or more examples of the disclosure.

FIG. 6 depicts another diagram 600 illustrating example techniques of predicting potential trajectories for a dynamic object in an environment, based at least in part on one or more predicted destinations, and/or semantic features associated with the object and/or the potential destinations. In this example, the same top-down representation of the driving scene 402 is depicted, including a pedestrian 404 moving through the parking lot toward a number of possible destinations.

As shown in this example, a trajectory prediction component 602 may determine one or more probable destinations for the dynamic object, and may determine one or more potential trajectories from the dynamic object to each of the probable destinations. For instance, the trajectory prediction component 602 in this example has selected the three probable destinations determined by the destination prediction component 502, which may correspond to the potential destinations that meet or exceed a probability threshold. For each of the probable destinations, the trajectory prediction component 602 has determined a corresponding trajectory for each of the probable destinations. For the potential destination 506 the trajectory prediction component 602 may determine a potential trajectory 604, for the potential destination 508 the trajectory prediction component 602 may determine a potential trajectory 606, and for the potential destination 510 the trajectory prediction component 602 may determine a potential trajectory 608. Although the trajectory prediction component 602 has determined a single potential trajectory for each destination in this case, in other examples the trajectory prediction component 602 may determine any number of possible trajectories for each destination.

The trajectories predicted by the trajectory prediction component 602 need not be straight-line trajectories between the pedestrian 404 and the predicted destination. Instead, in various examples the trajectory prediction component 602 may use a trained machine-learned prediction model to output one or more trajectory predictions. Such models may take into account the current trajectory of the object (e.g., velocity vector 406), the object type and capabilities of the dynamic object (e.g., pedestrian, bicycle, vehicle, etc.), the features of the environment (e.g., lines and street markings, signs, curbs, medians, crosswalks, etc.), and/or other objects in the environment.

As noted above, in some cases a probable trajectory for a dynamic object may be another dynamic object that is moving and/or capable of movement. In such cases, the destination prediction component 502 and/or trajectory prediction component 602 may be configured to determine predicted future locations for the destination objects, and then may determine trajectories for the dynamic object to the predicted future location(s) of the destination object. For instance, the trajectory prediction component 602 may determine a predicted trajectory for a potential destination object, to determine predicted locations for the destination object at one or more future times. The trajectory prediction component 602 then may determine a trajectory for the dynamic object that intersects with the future predicted locations for the destination object.

Figure 7:
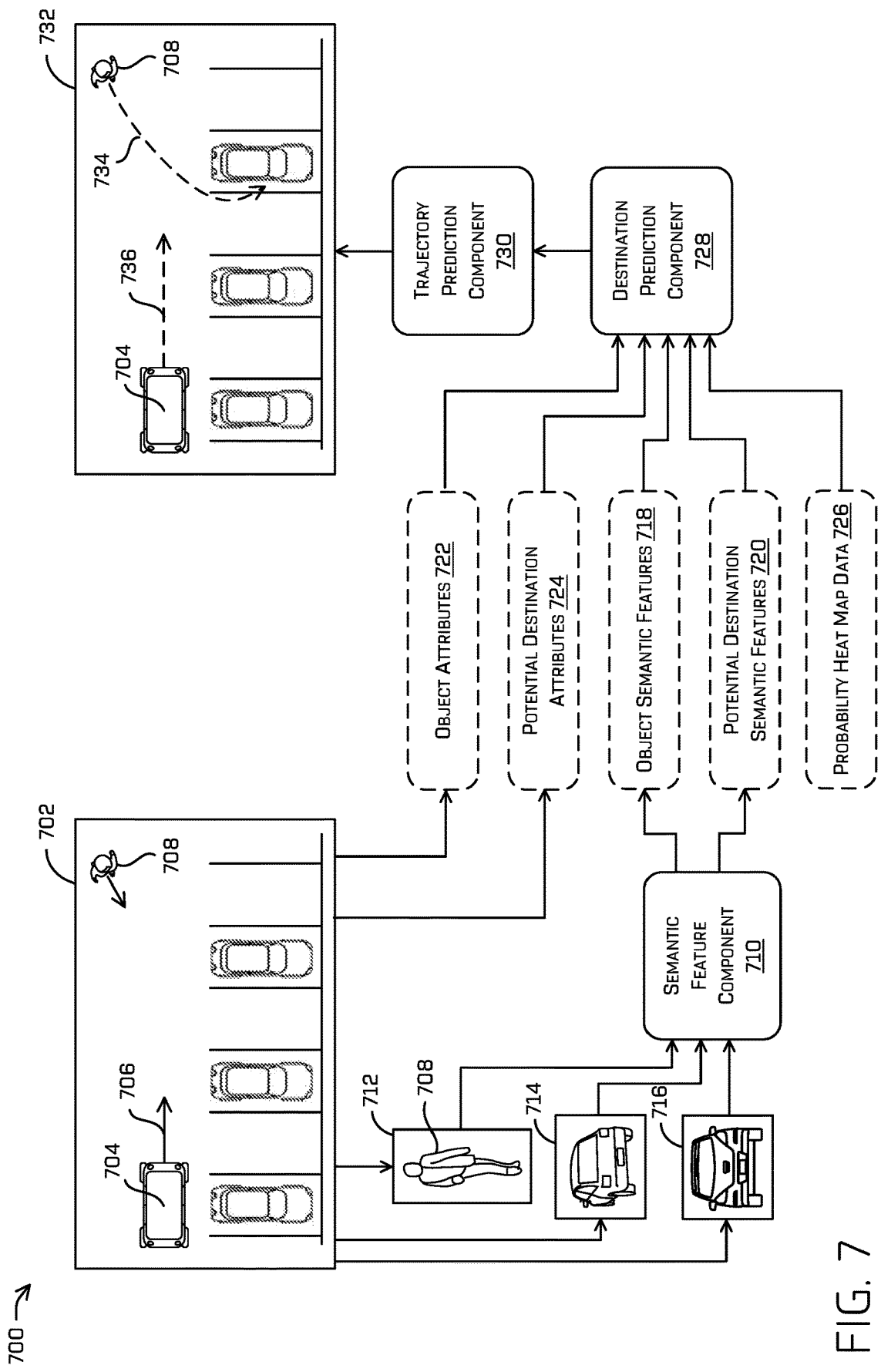
FIG. 7 illustrates an example system including a prediction component configured to determine potential destinations and trajectories of a dynamic object in an environment based on semantic features, in accordance with one or more examples of the disclosure.

FIG. 7 illustrates an example system 700 including a prediction component configured to determine potential destinations and trajectories of a dynamic object in an environment based on semantic features.

A first example driving scene 702 illustrates a scenario within an off-route driving environment in which an autonomous vehicle 704 is proceeding along a trajectory 706 through a parking lot. A pedestrian 708 is also included in the driving scene 702, pictured at a location moving generally toward and in front of the autonomous vehicle 704. In the context of a top-down prediction implementation, the perception and/or prediction components of the autonomous vehicle 704 may generate a multi-channel top-down representation of the environment at various points in time. For example, sensor data 712 may represent a segmented image (and/or other sensor data) capturing the pedestrian 708 at a particular time. Similarly, sensor data 714 may represent a segmented image (and/or other sensor data) capturing a first potential destination object, and sensor data 716 may represent a segmented image (and/or other sensor data) capturing a second potential destination object.

As shown in this example, the semantic feature component 710 may be configured to determine semantic features for the pedestrian 708 based on sensor data 712, and to determine semantic features for the potential destination objects based on sensor data 714 and 716. As discussed above, the semantic feature component 710 may use any number of machine-learned models and/or other techniques to determine and output object semantic features 718 associated with the dynamic object (e.g., pedestrian 708) and potential destination semantic features 720 associated with the various potential destinations of the dynamic object.

The destination prediction component 728 may determine and/or evaluate potential destinations for the dynamic object. As shown in this example, the destination prediction component 728 may determine potential destinations based at least in part on the object semantic features 718 and/or the potential destination semantic features 720 determined by the semantic feature component 710. Additionally, the destination prediction component 728 may use object attributes 722 and/or potential destination attributes 724 based on the sensor data from the environment. As described above, the object attributes 722 and potential destination attributes 724 may include attributes such as object types, sizes, orientations, poses, velocities, and accelerations. In some cases, the destination prediction component 728 may use trained models executed based on input including top-down multi-channel representations of the environment, in which the different channels include encoded semantic features, object attributes, and/or other environment attributes. Additionally or alternatively, the destination prediction component 728 may use probability heat map data 726, based on historical sensor data of the environment captured at previous times. For instance, probability heat data may include pedestrian and/or vehicle traffic patterns and routes, at different times and/or different rates, within the same environment as the driving scene 702 or similar environments.

As described above, the destination prediction component 728 may output one or more probable (or likely) destinations for the dynamic object. In some examples, the destination prediction component 728 also may provide probability data (e.g., confidence scores, weights, destination rankings, etc.) associated with the probable destinations. The trajectory prediction component 730 may receive the probable destinations and/or probability data, and may generate one or more potential trajectories for the dynamic object corresponding to the probable destinations. After the trajectory prediction component 730 determines the potential trajectories for the dynamic object (and/or additional dynamic objects in the environment), a planning component of the autonomous vehicle may determine a vehicle trajectory and/or driving maneuvers to control the autonomous vehicle.

The second driving scene 732 depicts the same driving environment as the first driving scene 702, including the autonomous vehicle 704 and the pedestrian 708 moving through the parking lot toward the autonomous vehicle. In this example, the second driving scene 732 includes a predicted trajectory 734 for the pedestrian 708 determined by the trajectory prediction component 730. Based on the predicted trajectory 734 of the pedestrian 708, the planning component of the autonomous vehicle 704 has determined a vehicle trajectory 736 for controlling the autonomous vehicle 704. The vehicle trajectory 736 may be a trajectory determined to safely navigate the environment without colliding with or encroaching on the predicted trajectory 734 of the pedestrian 708. Additionally, although a single predicted trajectory 734 and single vehicle trajectory 736 are described in this example, it can be understood that the trajectory prediction component 730 may generate multiple potential trajectories for the pedestrian 708. When generating a vehicle trajectory for the autonomous vehicle 704, the planning component may determine a safe and efficient trajectory with respect to any number of the multiple potential trajectories for the pedestrian 708. In some cases, the planning component may control the autonomous vehicle 704 to stop or reverse course, or may determine multiple possible trajectories (e.g., a primary trajectory and one or more contingent trajectories) to account for the different potential trajectories of the pedestrian 708.

Figure 8:
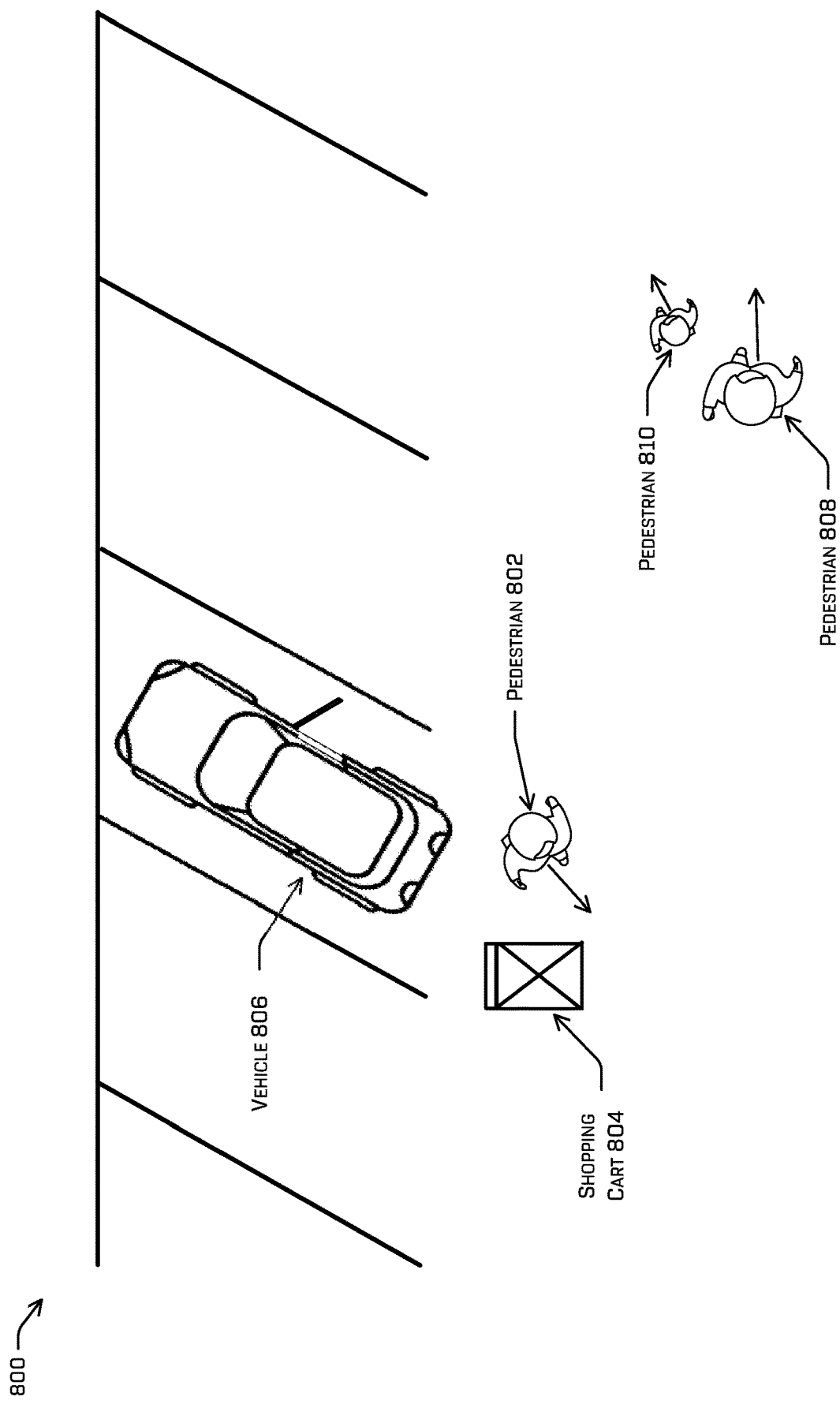
FIG. 8 illustrates an example driving environment in which a prediction component may determine relationships between dynamic objects based on semantic features, in accordance with one or more examples of the disclosure.

FIG. 8 illustrates another example off-route driving environment 800, which in this example corresponds to a parking lot. As shown in the examples above, the prediction component may be used to determine potential destinations and/or trajectories for dynamic objects in an environment, based at least in part on semantic features. Additionally or alternatively, the prediction component may determine groupings and/or relationships between multiple objects in the environment. Such relationships may include relationships between multiple dynamic objects, including groups of pedestrians, bicycles, or vehicles traveling together, etc. In other examples, relationships may be determined between one or more dynamic object(s) and a static object or group of static objects, such as a group of pedestrians associated with a parked car, storefront, sign, or other landmark.

To determine groupings and/or relationships between multiple objects, the prediction component may use similar or identical trained models to those described above for predicting and evaluating potential destinations. For instance, an object grouping machine-learning model may use object types and/or additional object attributes, in combination with any of the semantic features described herein, to determine relationships between objects that can be used to predict dynamic object destinations and/or trajectories with greater accuracy. In some examples, an object grouping machine-learning model may use as input a multi-channel top-down representation of a driving scene, including encoded semantic features and/or attributes for the objects in the driving scene In this example, the driving environment 800 is a parking lot including a pedestrian 802, unloading a shopping cart 804 into a vehicle 806. Using an object grouping machine-learning model, a prediction component may determine relevant semantic features associated with the pedestrian 802, the shopping cart 804, and the vehicle 806 to determine a relationship between these objects. For instance, the proximity of (or contact between) the pedestrian 802 to the shopping cart 804, the types and/or number of bags carried by the pedestrian 802 and contained in the shopping cart 804, the trunk and/or doors of the vehicle 806 being open, and/or other semantic features may indicate that the pedestrian 802 is currently engaged in loading bags from the shopping cart 804 into the vehicle 806. Accordingly, after determining the relationship between the objects, the prediction component may determine more accurate destinations and/or trajectories for the pedestrian 802 within the environment. For instance, when the pedestrian 802 faces and moves away from the vehicle 806, as shown in this example, the prediction component may accurately predict that the pedestrian 802 is moving to retrieve additional bags from the shopping cart 804 rather than moving to cross the parking lot (as would be predicted based on the trajectory of the pedestrian alone).

Additionally, in this example, the driving environment 800 includes a pedestrian 808 and another pedestrian 810 walking in generally the same direction through the parking lot. Based on the proximity between the pedestrians and/or the semantic features of the pedestrians, a trained grouping model may determine that the pedestrians are walking together to the same destination. For instance, the grouping model may determine based on the sizes, clothing, and/or other semantic features that the pedestrian 808 is a parent and pedestrian 810 is a child. Based on the determined relationship between the pedestrians, the prediction component may determine more accurate destinations and/or trajectories for both pedestrians. For instance, if the pedestrian 810 is a young child, he/she may change trajectory and/or speed frequently, may run for short periods and then turn around and return to their parent, etc. In these instances, the prediction component may more accurately predict the behavior of child pedestrian 808, rather than assuming he/she will continue along its current trajectory.

Figure 9:
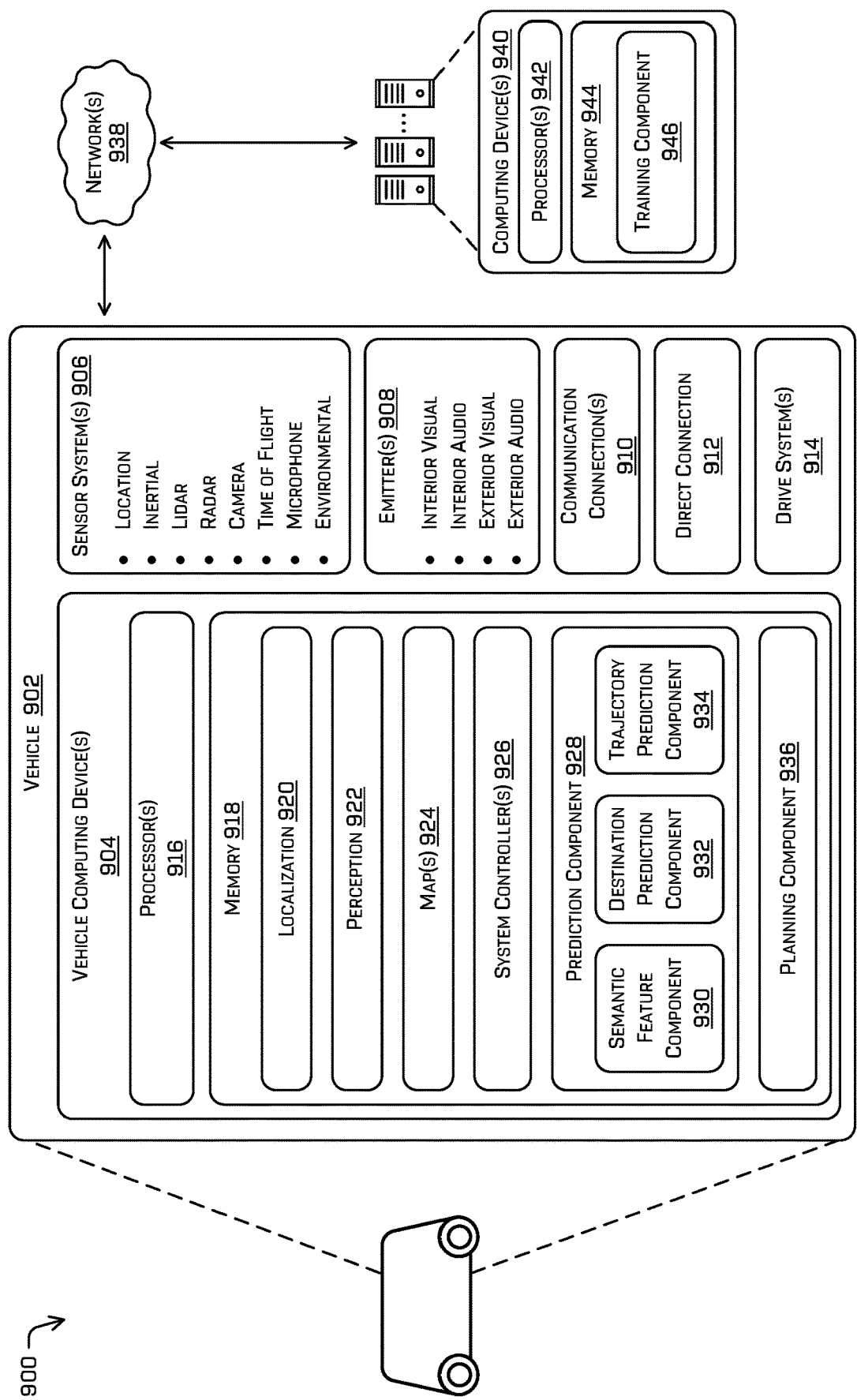
FIG. 9 depicts a block diagram of an example system for implementing various techniques described herein.

FIG. 9 depicts a block diagram of an example system 900 for implementing the techniques described herein. In at least one example, the system 900 can include a vehicle 902, which can correspond to the vehicle 102 of FIG. 1 and the vehicle 704 of FIG. 7.

FIG. 9 depicts a block diagram of an example system 900 for implementing various techniques described herein. The system 900 can include a vehicle 902, which can correspond to vehicle 102 of FIG. 1, vehicle 704 of FIG. 7, and/or other any autonomous or semi-autonomous vehicle described herein. The vehicle 902 configured to perform various techniques and examples of predicting potential destinations and potential trajectories for dynamic objects in driving environments, by detecting and using a combination of object attributes and/or semantic features for the dynamic object and potential destinations. In this example, the vehicle 902 may determine semantic features for dynamic objects and any number of potential destination objects in a driving environment, and may determine one or more probable destinations for the dynamic object based on the combination of semantic features. Based on the probable destinations for the dynamic object, the vehicle 902 may determine one or more predicted trajectories for the dynamic object, and may use the predicted trajectories to determine driving maneuvers for the vehicle 902 to traverse the environment safely and efficiently.

The vehicle 902 in this example may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 902 can be configured to control all functions from start to completion of the trip, including all navigation and parking functions, it may or may not include a driver and/or controls for driving the vehicle 902, such as a steering wheel, an acceleration pedal, and/or a brake pedal. In the illustrated example, the vehicle 902 is an autonomous vehicle; however, the vehicle 902 could be any other type of vehicle or robotic platform. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 902 can include vehicle computing device(s) 904, one or more sensor systems 906, one or more emitters 908, one or more communication connections 910, at least one direct connection 912, and one or more drive systems 914. The vehicle computing device(s) 904 also can include one or more processors 916 and memory 918 communicatively coupled with the one or more processors 916. In the illustrated example, the memory 918 of the vehicle computing device(s) 904 stores a localization component 920, a perception component 922, one or more maps 924, one or more system controllers 926, a prediction component 928 comprising a semantic feature component 930, a destination prediction component 932, and a trajectory prediction component 934, and a planning component 936. Though depicted in FIG. 9 as residing in the memory 918 for illustrative purposes, it is contemplated that the localization component 920, the perception component 922, the one or more maps 924, the one or more system controllers 926, the prediction component 928, the semantic feature component 930, the destination prediction component 932, the trajectory prediction component 934, and a planning component 936 can additionally, or alternatively, be accessible to the vehicle 902 (e.g., stored on, or otherwise accessible by, memory remote from the vehicle 902).

In at least one example, the localization component 920 can include functionality to receive data from the sensor system(s) 906 to determine a position and/or orientation of the vehicle 902 (e.g., one or more of an x-, y-, z-position, roll, pitch, or yaw). For example, the localization component 920 can include and/or request/receive a map of an environment and can continuously determine a location and/or orientation of the autonomous vehicle within the map. In some instances, the localization component 920 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 920 can provide data to various components of the vehicle 902 to determine an initial position of an autonomous vehicle for generating a trajectory and/or for determining that an object is proximate to one or more crosswalk regions and/or for identifying candidate reference lines, as discussed herein.

In some instances, and in general, the perception component 922 can include functionality to perform object detection, segmentation, and/or classification. In some examples, the perception component 922 can provide processed sensor data that indicates a presence of an entity that is proximate to the vehicle 902 and/or a classification of the entity as an entity type (e.g., car, pedestrian, cyclist, animal, building, tree, road surface, curb, sidewalk, stoplight, stop sign, unknown, etc.). In additional or alternative examples, the perception component 922 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 918 can further include one or more maps 924 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 924 can include at least one map (e.g., images and/or a mesh).

In some examples, the vehicle 902 can be controlled based at least in part on the maps 924. That is, the maps 924 can be used in connection with the localization component 920, the perception component 922, the prediction component 928, and/or the planning component 936 to determine a location of the vehicle 902, identify objects in an environment, and/or generate routes and/or trajectories to navigate within an environment.

In some examples, the one or more maps 924 can be stored on a remote computing device(s) (such as the computing device(s) 940) accessible via network(s) 938. In some examples, multiple maps 924 can be stored based on, for example, a characteristic (e.g., type of entity, time of day, day of week, season of the year, etc.). Storing multiple maps 924 can have similar memory requirements, but can increase the speed at which data in a map can be accessed.

In at least one example, the vehicle computing device(s) 904 can include one or more system controllers 926, which can be configured to control steering, propulsion, braking, safety, emitters, communication, and other systems of the vehicle 902. These system controller(s) 926 can communicate with and/or control corresponding systems of the drive system(s) 914 and/or other components of the vehicle 902.

In general, the prediction component 928 can include functionality to generate predicted information associated with objects in an environment. As discussed above, in some examples the prediction component 928 may include sub-components implemented to determine semantic features associated with pedestrians and/or other dynamic objects in the environment, determine potential destinations based on the semantic features, and determine potential trajectories for the dynamic objects based on the potential destinations. In some examples, the techniques discussed herein can be implemented to predict trajectories of objects (e.g., a pedestrian, a vehicle, and the like) at various points in time as the vehicle 902 traverses an environment. In some examples, the prediction component 928 can generate one or more predicted trajectories for such target objects based on attributes and/or semantic features of the dynamic object, potential destination objects, and/or other objects proximate the dynamic object.

The semantic feature component 930 can include functionality to detect semantic features associated with objects in an environment. In some examples, the semantic feature component 930 may be similar or identical to the semantic feature component 420 and the semantic feature component 710 described above in reference to FIG. 4 and FIG. 7 respectively. The semantic feature component 930 can receive data from the perception component 922, and use models and/or additional object detection techniques to determine semantic features associated with the objects in the environment.

In some examples, attributes of an object (e.g., a pedestrian) can be determined based on sensor data captured over time, and can include, but are not limited to, one or more of a position of the pedestrian at a time (e.g., wherein the position can be represented in the frame of reference discussed above), a velocity of the pedestrian at the time (e.g., a magnitude and/or angle with respect to the first axis (or other reference line)), an acceleration of the pedestrian at the time, an indication of whether the pedestrian is in a drivable area (e.g., whether the pedestrian is on a sidewalk or a road), an indication of whether the pedestrian is in a crosswalk region, an indication of whether the pedestrian is jaywalking, a vehicle context (e.g., a presence of a vehicle in the environment and attribute(s) associated with the vehicle), an object association (e.g., whether the pedestrian is travelling in a group of pedestrians), a distance to an object/landmark (e.g., a potential destination) in a first direction (e.g., a global x-direction), a distance to an object/landmark in a second direction (e.g., a global y-direction), a distance to a road, and the like.

In addition to object attributes, the semantic features of an object may include observable and/or deducible features relating to the intent or purpose of the object. As described above, the semantic feature component 930 may determine different semantic features for different object types (e.g., pedestrians, vehicles, bicycles, buildings, etc.). Additionally, semantic features may be determined for individual objects and/or for pairs or groups of related objects, such as a dynamic object and potential destination object, or a group of dynamic objects moving together in the environment.

In some examples, attributes and/or semantic features can be determined for a dynamic object (e.g., a pedestrian) and/or potential destinations (e.g., one or more vehicles, buildings, pedestrians, etc.) of the dynamic object. Attributes and/or semantic features can be determined can be determined for dynamic objects and/or potential destinations at one or more times. For example, attributes can include, but are not limited to, one or more of a velocity of the object at a time, an acceleration of the object at the time, a position of the object at the time (e.g., in global or local coordinates), a bounding box associated with the object at the time (e.g., representing extent(s) of the object, roll, pitch, and/or yaw), a lighting state associated with the object at the first time (e.g., headlight(s), braking light(s), hazard light(s), turn indicator light(s), reverse light(s), etc.), a distance between the object and a map element at the time (e.g., a distance to a stop line, traffic line, speed bump, yield line, intersection, driveway, etc.), a distance between the object and other objects, a classification of the object (e.g., car, vehicle, animal, truck, bicycle, etc.), a characteristic associated with the object (e.g., whether the object is changing lanes, is a double parked vehicle, etc.), and the like.

In some examples, any combination of attributes and/or semantic features for an object can be determined at various different times, as discussed herein. Attributes and/or semantic features can be determined over time (e.g., at times $T_{-M}, \ldots, T_{-2}, T_{-1}, T_0$ (where M is an integer) and the various times represent any time up to a most recent time) and input to the destination prediction component 932 and/or the trajectory prediction component 934 to determine predicted information associated with objects in the environment.

The destination prediction component 932 can include functionality to determine one or more potential destinations for an object in an environment, as discussed herein. In the context of a pedestrian, the destination prediction component 932 can determine various possible destinations for the pedestrian, including vehicles, other pedestrians, buildings, crosswalks, and/or other landmarks detected by the vehicle 902. Further, the attributes and/or semantic features associated with the object and the potential destination(s) for any period of time can be input to the destination prediction component 932 to determine a score, probability, and/or likelihood that a dynamic object (e.g., pedestrian) is heading towards or may be associated with a particular destination. Similar or identical determinations for potential destinations and associated probabilities can be determined for dynamic objects such as vehicles, bicycles, animals, and/or other dynamic objects.

In some examples, the semantic feature component 930 and/or the destination prediction component 932 may include one or more machine learned models, implemented as artificial neural networks such as a fully connected neural networks, a convolutional neural networks, a recurrent neural network, and the like.

In such examples, the semantic feature component 930 and/or destination prediction component 932 can be trained by reviewing data logs to determine semantic features associated with various objects in an environment, and to determine potential destinations for the dynamic objects based at least in part on the semantic features (and/or based on additional object attributes). Semantic features and/or destinations can be identified for objects (e.g., pedestrians, vehicles, etc.), and data representing the objects and semantic features can be identified as training data. The training data can be input to machine learning models where a known result (e.g., a ground truth, such as the known "future" attributes) can be used to adjust weights and/or parameters of the machine learning model to minimize an error.

The trajectory prediction component 934 can include functionality to generate or otherwise determine predicted trajectories (e.g., sequences of location(s)) associated with objects in an environment. For example, as discussed herein, attribute and/or semantic feature information can be determined for one or more objects in an environment, which may include a dynamic object and/or other object representing a potential destination of the dynamic object. In some examples, attributes and/or semantic features associated with the dynamic object and/or potential destination can be used to determine a trajectory (e.g., a sequency of waypoints and corresponding times for the object between its current location and the potential destination).

In some examples, the trajectory prediction component 934 can include functionality to identify candidate reference lines in an environment (e.g., based on map data) and can select a reference line (e.g., based on a similarity score) to determine the predicted location(s) of the trajectory with respect to the reference line. The trajectory prediction component 934 also may be include one or more a machine-learned models such as artificial neural networks including a fully connected neural network, a convolutional neural network, a recurrent neural network, and the like, or any combination thereof. For example, the trajectory prediction component 934 can be trained by reviewing data logs and determining attribute and/or semantic feature information. Training data representing relevant events (e.g., pedestrians, vehicles, and/or other objects traversing through the environment, and the like) can be input to a machine learning model where a known result (e.g., a ground truth, such as the known "future" attributes/locations) can be used to adjust weights and/or parameters of the machine learning model to minimize an error In general, the planning component 936 can determine a path for the vehicle 902 to follow to traverse the environment. For example, the planning component 936 can determine various routes and trajectories and various levels of detail. For example, the planning component 936 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 936 can generate an instruction for guiding the autonomous vehicle along at least a portion of the route from the first location to the second location. In at least one example, the planning component 936 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 902 to navigate.

In some instances, the planning component 936 can generate one or more trajectories for the vehicle 902 based at least in part on predicted trajectories and/or location(s) associated with object(s) in an environment. In some examples, the planning component 936 can use temporal logic, such as linear temporal logic and/or signal temporal logic, to evaluate one or more trajectories of the vehicle 902.

As can be understood, the components discussed herein (e.g., the localization component 920, the perception component 922, the one or more maps 924, the one or more system controllers 926, the prediction component 928, the semantic feature component 930, the destination prediction component 932, the trajectory prediction component 934, and the planning component 936) are described as divided for illustrative purposes. However, the operations performed by the various components can be combined or performed in any other component. Further, any of the components discussed as being implemented in software can be implemented in hardware, and vice versa. Further, any functionality implemented in the vehicle 902 can be implemented in the computing device(s) 940, or another component (and vice versa).

In at least one example, the sensor system(s) 906 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 906 can include multiple instances of each of these or other types of sensors. For instance, the time of flight sensors can include individual time of flight sensors located at the corners, front, back, sides, and/or top of the vehicle 902. As another example, the camera sensors can include multiple cameras disposed at various locations about the exterior and/or interior of the vehicle 902. The sensor system(s) 906 can provide input to the vehicle computing device(s) 904. Additionally or alternatively, the sensor system(s) 906 can send sensor data, via the one or more networks 938, to the one or more computing device(s) 940 at a particular frequency, after a lapse of a predetermined period of time, in near real-time, etc.

The vehicle 902 can also include one or more emitters 908 for emitting light and/or sound, as described above. The emitters 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include one or more communication connection(s) 910 that enable communication between the vehicle 902 and one or more other local or remote computing device(s). For instance, the communication connection(s) 910 can facilitate communication with other local computing device(s) on the vehicle 902 and/or the drive system(s) 914. Also, the communication connection(s) 910 can allow the vehicle to communicate with other nearby computing device(s) (e.g., other nearby vehicles, traffic signals, etc.). The communications connection(s) 910 also enable the vehicle 902 to communicate with a remote teleoperations computing device or other remote services.

The communications connection(s) 910 can include physical and/or logical interfaces for connecting the vehicle computing device(s) 904 to another computing device or a network, such as network(s) 938. For example, the communications connection(s) 910 can enable wireless network technologies, including WI-FI™ communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 can include one or more drive systems 914. In some examples, the vehicle 902 can have a single drive system 914. In at least one example, if the vehicle 902 has multiple drive systems 914, individual drive systems 914 can be positioned on opposite ends of the vehicle 902 (e.g., the front and the rear, etc.). In at least one example, the drive system(s) 914 can include one or more sensor systems to detect conditions of the drive system(s) 914 and/or the surroundings of the vehicle 902. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 914. In some cases, the sensor system(s) on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 914. Furthermore, the drive system(s) 914 also include one or more communication connection(s) that enable communication by the respective drive system with one or more other local or remote computing device(s).

In at least one example, the direct connection 912 can provide a physical interface to couple the one or more drive system(s) 914 with the body of the vehicle 902. For example, the direct connection 912 can allow the transfer of energy, fluids, air, data, etc. between the drive system(s) 914 and the vehicle. In some instances, the direct connection 912 can further releasably secure the drive system(s) 914 to the body of the vehicle 902.

In at least one example, the localization component 920, the perception component 922, the one or more maps 924, the one or more system controllers 926, the prediction component 928, the semantic feature component 930, the destination prediction component 932, the trajectory prediction component 934, and the planning component 936 can process sensor data, as described above, and can send their respective outputs, over the one or more network(s) 938, to one or more computing device(s) 940. In at least one example, the localization component 920, the one or more maps 924, the one or more system controllers 926, the prediction component 928, the semantic feature component 930, the destination prediction component 932, the trajectory prediction component 934, and the planning component 936 can send their respective outputs to the one or more computing device(s) 940 at a particular frequency, after a lapse of a predetermined period of time, in near real-time, etc.

In some examples, the vehicle 902 can send sensor data to one or more computing device(s) 940 via the network(s) 938. In some examples, the vehicle 902 can send raw sensor data to the computing device(s) 940. In other examples, the vehicle 902 can send processed sensor data and/or representations of sensor data to the computing device(s) 940. In some examples, the vehicle 902 can send sensor data to the computing device(s) 940 at a particular frequency, after a lapse of a predetermined period of time, in near real-time, etc. In some cases, the vehicle 902 can send sensor data (raw or processed) to the computing device(s) 940 as one or more log files.

The computing device(s) 940 can include processor(s) 942 and a memory 944 storing a training component 946.

In some instances, the training component 946 can include functionality to train one or more models to determine prediction information, as discussed herein. In some instances, the training component 946 can communicate information generated by the one or more models to the vehicle computing device(s) 904 to revise how to control the vehicle 902 in response to different situations.

For example, the training component 946 can train one or more machine learning models to generate the prediction component(s) discussed herein. In some examples, the training component 946 can include functionality to search data logs and determine semantic features, potential destinations, and/or trajectories (e.g., in any one or more reference frames) information associated with dynamic object(s) in the environment. Log data that corresponds to particular scenarios (e.g., a pedestrian or other dynamic object traversing an off-route environment, a construction zone, or an accident scene, etc.) can represent training data. The training data can be input to a machine learning model where a known result (e.g., a ground truth, such as the known "future" attributes) can be used to adjust weights and/or parameters of the machine learning model to minimize an error.

For instance, aspects of some or all of the components discussed herein can include any models, algorithms, and/or machine learned algorithms. For example, in some instances, the components in the memory 944 (and the memory 918, discussed above) can be implemented as a neural network. In some examples, the training component 946 can utilize a neural network to generate and/or execute one or more models to determine segmentation information from sensor data, as discussed herein.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural al Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 916 of the vehicle 902 and the processor(s) 942 of the computing device(s) 940 can be any suitable processor capable of executing instructions to process data and perform operations as described herein. By way of example and not limitation, the processor(s) 916 and 942 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 918 and 944 are examples of non-transitory computer-readable media. The memory 918 and 944 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 9 is illustrated as a distributed system, in alternative examples, components of the vehicle 902 can be associated with the computing device(s) 940 and/or components of the computing device(s) 940 can be associated with the vehicle 902. That is, the vehicle 902 can perform one or more of the functions associated with the computing device(s) 940, and vice versa. Further, aspects of the prediction component 928 (and subcomponents) can be performed on any of the devices discussed herein.

Figure 10:
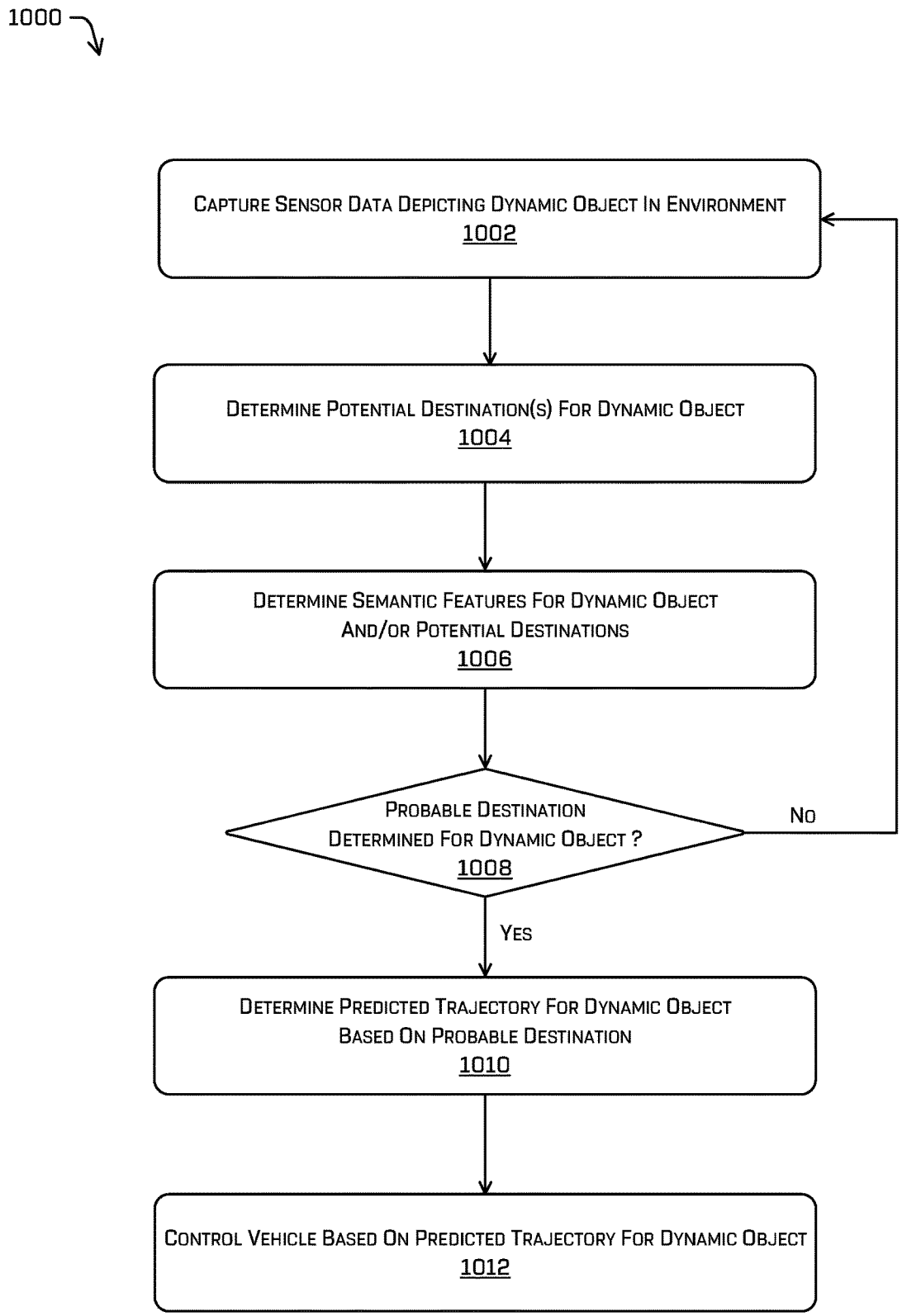
FIG. 10 is a flow diagram illustrating an example process of predicting a destination and trajectory for a dynamic object based on semantic features, and controlling an autonomous vehicle based on the predicted trajectory of the dynamic object, in accordance with one or more examples of the disclosure

FIG. 10 is a flow diagram illustrating an example process 1000 of determining a predicted destinations and/or trajectories for a dynamic object in an environment based on semantic features, and controlling an autonomous vehicle based on the predicted trajectory(ies) of the dynamic object. As described below, the operations in process 1000 may be performed by an autonomous vehicle including a prediction component. For instance, process 1000 may be performed by an autonomous vehicle 102 including a prediction component 104 configured to execute a semantic feature component, destination prediction component, and/or trajectory prediction component as described herein.

Process 1000 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation.

Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 1002, the prediction component may capture (or otherwise receive) sensor data of a driving environment. In this example, the sensor data may include data depicting a dynamic object, along with various other static and/or dynamic objects. The sensor data may include image data depicting a driving scene, and/or may include various other sensor data types instead of or in addition to image data (e.g., lidar point clouds, radar data, audio data, etc.). Additionally, as described above, the driving environment may include an environment within a route-based reference system, and/or an off-route environment outside of the boundaries of the route-based reference systems known to the autonomous vehicle. In some examples, different trained models may be used in on-route and off-route environments, based on the relative predictability of dynamic objects within the on-route environments.

At operation 1004, the prediction component may determine one or more potential destinations for the dynamic object, based on the sensor data. As noted above, potential destinations for a dynamic object may include locations and/or other objects of various object types (e.g., vehicles, pedestrians, buildings, crosswalks, and/or other landmarks). The potential destinations may be depicted with the sensor data captured by the autonomous vehicle, or may be otherwise known the autonomous vehicle (e.g., known landmarks based on maps and/or localization data). In some examples, the prediction component may use the current trajectory (e.g., velocity vector) of the dynamic object and/or other object attributes to determine the initial set of potential destinations.

At operation 1006, the prediction component may determine sematic features associated with the dynamic object and/or the potential destinations within the environment. For example, the prediction component may include a semantic feature component as described herein, configured to determine semantic features for the dynamic object and/or semantic features for any number of potential destinations in the environment. In some cases, the semantic feature component may use sets of trained machine-learned models associated with particular object types, to determine the presence or absence of various semantic features for objects of different types within the environment.

At operation 1008, the prediction component may determine whether one or more of the potential destinations of the dynamic object are probable destinations, based at least in part on the semantic features. For example, the prediction component may include a destination prediction component configured to determine or evaluate potential destinations based on semantic features. The destination prediction component may execute one or more trained models configured to output predicted destination (e.g., probable destinations) and/or probability data associated with the destinations. In some cases, a trained destination prediction model may receive inputs based on the semantic features of the dynamic object and/or the potential destinations for the dynamic object. A top-down multi-channel representation of the driving environment may be used in some examples, in which semantic features, other object attributes, and/or other environment attributes are encoded as channels of the representation. Additionally, in some instances a destination prediction component may use probability heat map data based on historical sensor data of the environment (or similar environments) captured at previous times, to predict or evaluate the probable destinations for the dynamic object.

At operation 1008, the prediction component may determine whether one or more of the potential destinations of the dynamic object are probable destinations. For instance, the prediction component may compare probability data associated with a potential destinations to a confidence threshold. It can be understood that evaluating the probability data associated with potential destinations may be optional in some examples, and all potential destinations may be considered and used to determine potential trajectories for the dynamic object. However, filtering and/or weighting potential destinations based on probabilities may provide advantages in some cases for both vehicle safety and efficiency.

When none of the potential destinations of the dynamic object are determined to be probable destinations (1008: No), then process 1000 may return to operation 1002 to continue capturing sensor data of the driving environment. In such cases, the autonomous vehicle may be controlled to maintain a current trajectory, to stop or yield to approaching objects, and/or may apply other more cautious driving maneuvers based on the reduced level of confidence in the potential destinations of the dynamic object.

In contrast, when one or more of the potential destinations is determined to be a probable destination (1008: Yes), then at operation 1010 the prediction component may determine one or more predicted trajectories for the dynamic object, based on the probable destinations. In some examples, a trajectory prediction component may receive the probable destinations (and/or probability data) and may generate one or more potential trajectories for the dynamic object corresponding to the probable destinations.

At operation 1012, the autonomous vehicle may be controlled based on the predicted trajectories for the dynamic object. For example, after the trajectory prediction component determines the potential trajectory(ies) for the dynamic object, and/or for additional dynamic objects in the environment, the planning component of the autonomous vehicle may determine a vehicle trajectory and/or driving maneuvers to control the autonomous vehicle. In some cases, the planning component may control the autonomous vehicle to maintain its current position or reverse course (e.g., in off-route environments) to provide the dynamic objects with additional time and space to maneuver. In other cases, the planning component may control the autonomous vehicle to follow a modified trajectory that continues along a route to an intended destination, but changes the route to circumvent the predicted trajectories of the dynamic objects in the environment.

EXAMPLE CLAUSES

A. An autonomous vehicle comprising: a sensor; one or more processors; and one or more computer-readable media storing instructions that, when executed by the one or more processors, cause the autonomous vehicle to perform operations comprising: receiving sensor data from the sensor representing an environment proximate the autonomous vehicle; detecting, based at least in part on the sensor data, the presence of a pedestrian in the environment associated with a semantic feature; determining, based at least in part on the sensor data, the semantic feature, and a map, a potential destination associated with the pedestrian; determining, based at least in part on the sensor data, a multi-channel representation of the environment; encoding, based at least in part on the semantic feature, a channel of the multi-channel representation to indicate the potential destination; inputting the multi-channel representation as input to a machine learning model; receiving, from the machine learning model, a predicted trajectory of the pedestrian; and controlling the autonomous vehicle to perform a maneuver in the environment, based at least in part on the predicted trajectory of the pedestrian.

B. The autonomous vehicle of paragraph A, wherein the potential destination comprises a vehicle, and wherein the semantic feature is determined based at least in part on one or more of: determining the pedestrian is carrying an item; determining that the pedestrian is controlling a wheeled vehicle; determining an animal associated with the pedestrian; determining a uniform worn by the pedestrian; determining that the vehicle is running; determining that a door of the vehicle is open; determining that a trunk of the vehicle is open; or determining that the vehicle includes at least one passenger.

C. The autonomous vehicle of paragraph A, the operations further comprising: receiving probabilistic trajectory data, based at least in part on previous sensor data associated with the environment, wherein a second channel of the multi-channel representation represents the probabilistic trajectory data.

D. The autonomous vehicle of paragraph A, the operations further comprising: determining a boundary of a route-based reference system within the environment; determining that the autonomous vehicle is outside of the route-based reference system, based at least in part on the boundary; and determining the machine learning model for execution, based at least in part on determining that the autonomous vehicle is outside of the route-based reference system.

E. The autonomous vehicle of paragraph A, the operations further comprising: determining, based at least in part on the sensor data, an additional object in the environment; and determining a relationship between the pedestrian and the additional object, based at least in part on the semantic feature, wherein determining the predicted trajectory of the pedestrian is based at least in part on the relationship between the pedestrian and the additional object.

F. A method comprising: receiving sensor data from a sensor associated with a vehicle operating in an environment; determining, based at least in part on the sensor data, a dynamic object in the environment; determining, based at least in part on the sensor data, a semantic feature associated with the dynamic object; determining, based at least in part the semantic feature, a potential destination associated with the dynamic object; determining, based at least in part on the potential destination, a predicted trajectory of the dynamic object; and controlling the vehicle to perform a maneuver in the environment, based at least in part on the predicted trajectory of the dynamic object.

G. The method of paragraph F, wherein the semantic feature is associated with a pedestrian and comprises at least one of: the pedestrian is carrying an item; the pedestrian is controlling a wheeled vehicle; an animal is associated with the pedestrian; or the pedestrian is wearing a uniform.

H. The method of paragraph F, wherein the potential destination comprises a destination vehicle, and wherein the semantic feature includes at least one of: the destination vehicle is running; a door of the destination vehicle is open; a trunk of the destination vehicle is open; or the destination vehicle includes at least one passenger.

I. The method of paragraph F, wherein determining the predicted trajectory comprises: determining a multi-channel representation of the environment, based at least in part on the sensor data; encoding a channel of the multi-channel representation, based at least in part on the potential destination; and providing the multi-channel representation as input to a machine learning model configured to output the predicted trajectory.

J. The method of paragraph I, wherein determining the predicted trajectory further comprises: receiving probabilistic trajectory data, based at least in part on previous sensor data associated with the environment; and encoding a second channel of the multi-channel representation, based at least in part on the probabilistic trajectory data.

K. The method of paragraph I, wherein determining the predicted trajectory further comprises: determining a boundary of a route-based reference system within the environment; determining that the vehicle is outside of the route-based reference system, based at least in part on the boundary; and determining the machine learning model for execution, based at least in part on determining that the vehicle is outside of the route-based reference system.

L. The method of paragraph F, further comprising: determining, based at least in part on the sensor data, a third object in the environment; determining a relationship between the dynamic object and the third object, based at least in part on the semantic feature; and determining a probability associated with the potential destination, based at least in part on the relationship between the dynamic object and the third object.

M. The method of paragraph F, wherein determining the potential destination is further based at least in part on map data.

N. One or more non transitory computer readable media storing instructions executable by a processor, wherein the instructions, when executed, cause the processor to perform operations comprising: receiving sensor data from a sensor associated with a vehicle operating in an environment; determining, based at least in part on the sensor data, a dynamic object in the environment; determining, based at least in part on the sensor data, a semantic feature associated with the dynamic object; determining, based at least in part the semantic feature, a potential destination associated with the dynamic object; determining, based at least in part on the potential destination, a predicted trajectory of the dynamic object; and controlling the vehicle to perform a maneuver in the environment, based at least in part on the predicted trajectory of the dynamic object.

O. The one or more non transitory computer readable media of paragraph N, wherein the semantic feature is associated with a pedestrian and comprises at least one of: the pedestrian is carrying an item; the pedestrian is controlling a wheeled vehicle; an animal is associated with the pedestrian; or the pedestrian is wearing a uniform.

P. The one or more non transitory computer readable media of paragraph N, wherein the potential destination comprises a destination vehicle, and wherein the semantic feature includes at least one of: the destination vehicle is running; a door of the destination vehicle is open; a trunk of the destination vehicle is open; or the destination vehicle includes at least one passenger.

Q. The one or more non transitory computer readable media of paragraph N, wherein determining the predicted trajectory comprises: determining a multi-channel representation of the environment, based at least in part on the sensor data; encoding a channel of the multi-channel representation, based at least in part on the potential destination; and providing the multi-channel representation as input to a machine learning model configured to output the predicted trajectory.

R. The one or more non transitory computer readable media of paragraph Q, wherein determining the predicted trajectory further comprises: receiving probabilistic trajectory data, based at least in part on previous sensor data associated with the environment; and encoding a second channel of the multi-channel representation, based at least in part on the probabilistic trajectory data.

S. The one or more non transitory computer readable media of paragraph Q, wherein determining the predicted trajectory further comprises: determining a boundary of a route-based reference system within the environment; determining that the vehicle is outside of the route-based reference system, based at least in part on the boundary; and determining the machine learning model for execution, based at least in part on determining that the vehicle is outside of the route-based reference system.

T. The one or more non transitory computer readable media of paragraph N, the operations further comprising: determining, based at least in part on the sensor data, a third object in the environment; determining a relationship between the dynamic object and the third object, based at least in part on the semantic feature; and determining a probability associated with the potential destination, based at least in part on the relationship between the dynamic object and the third object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. An autonomous vehicle comprising:
 a sensor;
 one or more processors; and
 one or more computer-readable media storing instructions that, when executed by the one or more processors, cause the autonomous vehicle to perform operations comprising:
  receiving sensor data from the sensor representing an environment proximate the autonomous vehicle, the environment including a pedestrian;
  determining, based at least in part on the sensor data, a semantic classification of the pedestrian and a semantic feature associated with the pedestrian, wherein the semantic classification comprises a pedestrian classification;
  determining, based at least in part on the sensor data, the semantic feature, and a map, a potential destination associated with the pedestrian;
  determining, based at least in part on the sensor data, a multi-channel representation of the environment;
  encoding, based at least in part on the semantic feature, a channel of the multi-channel representation to indicate the potential destination;
  determining a machine learning model for predicting a trajectory for the pedestrian, based at least in part on determining that the autonomous vehicle is outside of a boundary of a route-based reference system in the environment;
  inputting the multi-channel representation as input to the machine learning model;
  receiving, from the machine learning model, a predicted trajectory of the pedestrian; and
  controlling the autonomous vehicle to perform a maneuver in the environment, based at least in part on the predicted trajectory of the pedestrian.

2. The autonomous vehicle of claim 1, wherein the potential destination associated with the pedestrian comprises a destination vehicle, and wherein the semantic feature is determined based at least in part on one or more of:
 determining the pedestrian is carrying an item;
 determining that the pedestrian is controlling a wheeled vehicle;
 determining an animal associated with the pedestrian;
 determining a uniform worn by the pedestrian;
 determining that the destination vehicle is running;
 determining that a door of the destination vehicle is open;
 determining that a trunk of the destination vehicle is open; or
 determining that the destination vehicle includes at least one passenger.

3. The autonomous vehicle of claim 1, the operations further comprising:
 receiving probabilistic trajectory data, based at least in part on previous sensor data associated with the environment,
 wherein a second channel of the multi-channel representation represents the probabilistic trajectory data.

4. The autonomous vehicle of claim 1, the operations further comprising:
 determining, based at least in part on the sensor data, an additional object in the environment; and
 determining a relationship between the pedestrian and the additional object, based at least in part on the semantic feature,
 wherein determining the predicted trajectory of the pedestrian is based at least in part on the relationship between the pedestrian and the additional object.

5. A method comprising:
 receiving sensor data from a sensor associated with a vehicle operating in an environment;
 determining, based at least in part on the sensor data, a semantic classification of a dynamic object in the environment and a semantic feature associated with the dynamic object;
 determining, based at least in part on the semantic classification and the semantic feature, a predicted trajectory associated with the dynamic object, wherein determining the predicted trajectory comprises:
  encoding the semantic classification and the semantic feature associated with the dynamic object into a representation of the environment; and executing a machine-learned model, based at least in part on determining that the vehicle is outside of a route-based reference system within the environment, wherein the machine-learned model is configured to predict a trajectory for the dynamic object based at least in part on the representation; and controlling the vehicle to perform a maneuver in the environment, based at least in part on the predicted trajectory of the dynamic object.

6. The method of claim 5, wherein the semantic classification of the dynamic object is a pedestrian and wherein the semantic feature comprises at least one of:
   an item carried by the pedestrian;
   a wheeled vehicle controlled by the pedestrian;
   an animal controlled by the pedestrian; or
   a uniform worn by the pedestrian.

7. The method of claim 5, wherein the predicted trajectory is associated with a destination vehicle, and wherein the semantic feature includes at least one of:
   an indication that the destination vehicle is running;
   an indication that a door of the destination vehicle is open;
   an indication that a trunk of the destination vehicle is open; or
   an indication that the destination vehicle includes at least one passenger.

8. The method of claim 5, further comprising:
   determining, based at least in part on the sensor data, a third object in the environment;
   determining a relationship between the dynamic object and the third object, based at least in part on the semantic feature; and
   determining a probability associated with the predicted trajectory of the dynamic object, based at least in part on the relationship between the dynamic object and the third object.

9. The method of claim 5, wherein determining the semantic feature associated with the dynamic object comprises determining a separate object under the control of the dynamic object.

10. The method of claim 5, wherein the semantic feature associated with the dynamic object comprises a semantic feature of a potential destination associated with the dynamic object.

11. The method of claim 5, wherein the semantic feature associated with the dynamic object is indicative of at least one of an intent or a purpose of the dynamic object.

12. The method of claim 5, wherein the dynamic object is a pedestrian, and wherein determining the semantic feature comprises determining a type of a uniform worn by the pedestrian.

13. One or more non-transitory computer-readable media storing instructions executable by a processor, wherein the instructions, when executed, cause the processor to perform operations comprising:
   receiving sensor data from a sensor associated with a vehicle operating in an environment;
   determining, based at least in part on the sensor data, a semantic classification of a dynamic object in the environment and a semantic feature associated with the dynamic object;
   determining, based at least in part on the semantic classification and the semantic feature, a predicted trajectory associated with the dynamic object, wherein determining the predicted trajectory comprises:
      encoding the semantic classification and the semantic feature associated with the dynamic object into a representation of the environment; and
      executing a machine-learned model, based at least in part on determining that the vehicle is outside of a route-based reference system within the environment, wherein the machine-learned model is configured to predict a trajectory for the dynamic object based at least in part on the representation; and
   controlling the vehicle to perform a maneuver in the environment, based at least in part on the predicted trajectory of the dynamic object.

14. The one or more non-transitory computer-readable media of claim 13, wherein the semantic classification of the dynamic object is a pedestrian and wherein the semantic feature comprises at least one of:
   an item carried by the pedestrian;
   a wheeled vehicle controlled by the pedestrian;
   an animal controlled by the pedestrian; or
   a uniform worn by the pedestrian.

15. The one or more non-transitory computer-readable media of claim 13, wherein the predicted trajectory is associated with a destination vehicle, and wherein the semantic feature includes at least one of:
   an indication that the destination vehicle is running;
   an indication that a door of the destination vehicle is open;
   an indication that a trunk of the destination vehicle is open; or
   an indication that the destination vehicle includes at least one passenger.

16. The one or more non-transitory computer-readable media of claim 13, wherein determining the predicted trajectory comprises:
   determining the representation as a multi-channel representation of the environment, based at least in part on the sensor data;
   encoding a channel of the multi-channel representation, based at least in part on a associated with the dynamic object; and
   providing the multi-channel representation as input to the machine-learned model.

17. The one or more non-transitory computer-readable media of claim 16, wherein determining the predicted trajectory further comprises:
   receiving probabilistic trajectory data, based at least in part on previous sensor data associated with the environment; and
   encoding a second channel of the multi-channel representation, based at least in part on the probabilistic trajectory data.

18. The one or more non-transitory computer-readable media of claim 13, the operations further comprising:
   determining, based at least in part on the sensor data, a third object in the environment;
   determining a relationship between the dynamic object and the third object, based at least in part on the semantic feature; and
   determining a potential destination associated with the dynamic object, based at least in part on the relationship between the dynamic object and the third object.

19. The one or more non-transitory computer-readable media of claim 13, wherein determining the semantic feature associated with the dynamic object comprises determining a separate object under the control of the dynamic object.

20. The one or more non-transitory computer-readable media of claim 13, wherein the semantic feature associated with the dynamic object comprises a semantic feature of a potential destination associated with the dynamic object.

* * * * *